(12) United States Patent
Maslak

(10) Patent No.: US 10,979,387 B2
(45) Date of Patent: Apr. 13, 2021

(54) SYSTEMS AND METHODS FOR UTILIZATION OF ANYCAST TECHNIQUES IN A DNS ARCHITECTURE

(71) Applicant: Level 3 Communications, LLC, Broomfield, CO (US)

(72) Inventor: Joelle T. Maslak, Golden, CO (US)

(73) Assignee: Level 3 Communications, LLC, Broomfield, CO (US)

(*) Notice: Subject to any disclaimer, the term of this patent is extended or adjusted under 35 U.S.C. 154(b) by 42 days.

(21) Appl. No.: 16/559,045

(22) Filed: Sep. 3, 2019

(65) Prior Publication Data

US 2020/0076766 A1 Mar. 5, 2020

Related U.S. Application Data

(60) Provisional application No. 62/726,831, filed on Sep. 4, 2018.

(51) Int. Cl.
*H04L 29/12* (2006.01)
*H04L 12/803* (2013.01)

(52) U.S. Cl.
CPC ........ *H04L 61/2069* (2013.01); *H04L 47/125* (2013.01); *H04L 61/1511* (2013.01); *H04L 61/2007* (2013.01)

(58) Field of Classification Search
CPC ............... H04L 47/125; H04L 61/1511; H04L 61/2007; H04L 61/2069; H04L 61/609; H04L 67/1002
See application file for complete search history.

(56) References Cited

U.S. PATENT DOCUMENTS

| | | | |
|---|---|---|---|
| 9,756,071 B1* | 9/2017 | Golshan | H04L 63/1458 |
| 2013/0297754 A1* | 11/2013 | Wentink | H04L 61/2015 709/220 |
| 2015/0215388 A1* | 7/2015 | Kontothanassis | H04L 67/1008 709/226 |
| 2016/0294677 A1* | 10/2016 | Kazerani | H04L 45/22 |
| 2019/0132281 A1* | 5/2019 | Sawyer | H04L 47/122 |
| 2020/0366638 A1* | 11/2020 | Vasquez | H04L 61/2007 |

* cited by examiner

*Primary Examiner* — Michael C Lai

(57) ABSTRACT

Aspects of the present disclosure involve systems, methods, computer program products, and the like, for utilizing multiple anycast addresses within a domain name system (DNS) architecture of a CDN. one or more DNS servers of the architecture may announce a plurality of anycast addresses for receiving DNS requests from requesting devices. The group of addresses may be dispersed (and/or announced by) the DNS servers of the architecture such that each server announces a subset of the available addresses. The number and identity of the subset of available anycast addresses utilized may vary from server to server of the DNS architecture and may be determined based on groups of servers, configurations of metros or gateways of the DNS architecture, or performance metrics of one or more servers.

20 Claims, 15 Drawing Sheets

US 10,979,387 B2

SYSTEMS AND METHODS FOR UTILIZATION OF ANYCAST TECHNIQUES IN A DNS ARCHITECTURE

CROSS-REFERENCE TO RELATED APPLICATION

This application is related to and claims priority under 35 U.S.C. § 119(e) from U.S. Patent Application No. 62/726,831, filed Sep. 4, 2018 entitled "Systems and Methods for Distribution Balancing of DNS Traffic," the entire contents of which is incorporated herein by reference for all purposes.

TECHNICAL FIELD

Embodiments of the present invention generally relate to systems and methods for implementing a content distribution network (CDN), and more specifically for utilizing multiple anycast addresses within a domain name system (DNS) architecture of a CDN.

BACKGROUND

The Internet and the World Wide Web (the "Web") are ubiquitous and easily accessible using numerous possible wired or wireless computing devices. Content providers (publishers) now use the Internet (and, particularly, the Web) to provide all kinds of content to numerous users throughout the world through any number of platforms. In order to offload the job of serving some or all of its content, many content providers now operate or subscribe to content delivery networks (CDNs). Provider content can be served to clients from the CDN (i.e., from one or more content servers in the CDN) instead of from the content provider's server(s). In a caching CDN, content may also be cached on some or all of the CDN servers, either before being served or in response to specific requests for that content. Having content cached enhances the performance of the CDN because the content does not have to be retrieved from origin servers or other locations, which are less efficient than edge servers in providing content.

Numerous forms of content may be served from the CDN. For example, television shows and movies may now be accessed from any number of Web sites, and the shows and movies may be served from the CDN. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once provided on disc and mailed to recipients, are now routinely distributed to devices from a CDN through one or more network connections and devices.

CDNs typically include a domain name server (DNS) architecture to support the distribution of content from the CDN to a requesting device or user. In general, the DNS architecture includes multiple DNS servers that, in response to a request, return an Internet Protocol (IP) address or other device address at which requested content may be downloaded. In some instances, the DNS architecture may return several delegated DNS server addresses (or nameservers) from which more information to resolve the DNS request may be provided. However, the quantity of nameservers that may be returned in response to the DNS request may push the limits of scalability within standard internet DNS capabilities. As a result, new approaches for DNS network traffic management and DNS request handling have been developed, including utilizing load balancing and anycast techniques in an effort to reduce the size of results provided by the DNS system.

It is with these observations in mind, among many others, that aspects of the present disclosure were conceived and developed.

SUMMARY

One approach may include the use of anycast-based DNS where one DNS "server" IP address is actually assigned to more than one server, letting Internet protocol (IP) routing carry the traffic to the best location. Another approach disclosed herein implements load balancers within a gateway to provide similar functionality.

This disclosure proposes, among other things, the use of multiple anycast addresses to address some common problems with anycast design. For instance, a router or device may blackhole some traffic. There is also a need for monitoring of the anycast addresses and automatic announcement and withdrawal of the IPs One implementation of the present disclosure may take the form of a method for processing domain name system (DNS) requests. The method may include announcing, by a DNS server of a plurality of DNS servers and based on a configuration of the plurality of DNS servers, a subset of a plurality of anycast Internet Protocol (IP) addresses associated with a DNS network, the DNS server configured to receive a DNS request comprising at least one of the subset of the plurality of anycast IP addresses, receiving, at the DNS server and from a networking device, the DNS request comprising the at least one of the subset of the plurality of anycast IP addresses, and generating a response to the DNS request.

Another implementation of the present disclosure may take the form of a domain name system (DNS) architecture. The system may include a networking device and a plurality of DNS servers each in communication with the networking device. The at least one of the plurality of DNS servers configured to announce, based on a number of the plurality of DNS servers to the networking device, a subset of a plurality of anycast Internet Protocol (IP) addresses associated with the DNS architecture to which one or more DNS requests for the DNS architecture are addressed, receive, from the networking device and based on at least one of the announced subset of the plurality of anycast IP addresses, a DNS request comprising the at least one of the announced subset of the plurality of anycast IP addresses, and generate a response to the DNS request.

Yet another implementation of the present disclosure may take the form of a communications network comprising a first metro network comprising a first networking device and a first plurality of DNS servers each in communication with the first networking device. The communications network may also include a second metro network geographically separate from the first metro network and in communication with the first metro network, the second metro network comprising a second networking device and a second plurality of DNS servers each in communication with the second networking device. At least one of the first plurality of DNS servers and at least one of the second plurality of DNS servers are configured to announce a subset of a plurality of anycast Internet Protocol (IP) addresses to which one or more DNS requests are addressed, receive, from a corresponding networking device and based on at least one of the announced subset of the plurality of anycast IP addresses, a DNS request comprising the at least one of the announced subset of the plurality of anycast IP addresses, and generate a response to the DNS request.

Among other things, this disclosure proposes changes to conventional systems to facilitate such functionality. It should be noted that to the extent any particular network addresses, subnet, ports, or other identifiers are included in this disclosure, such identifiers are merely examples and any other suitable identifiers may be used in implementations of this disclosure.

DETAILED DESCRIPTION

Figure 1:
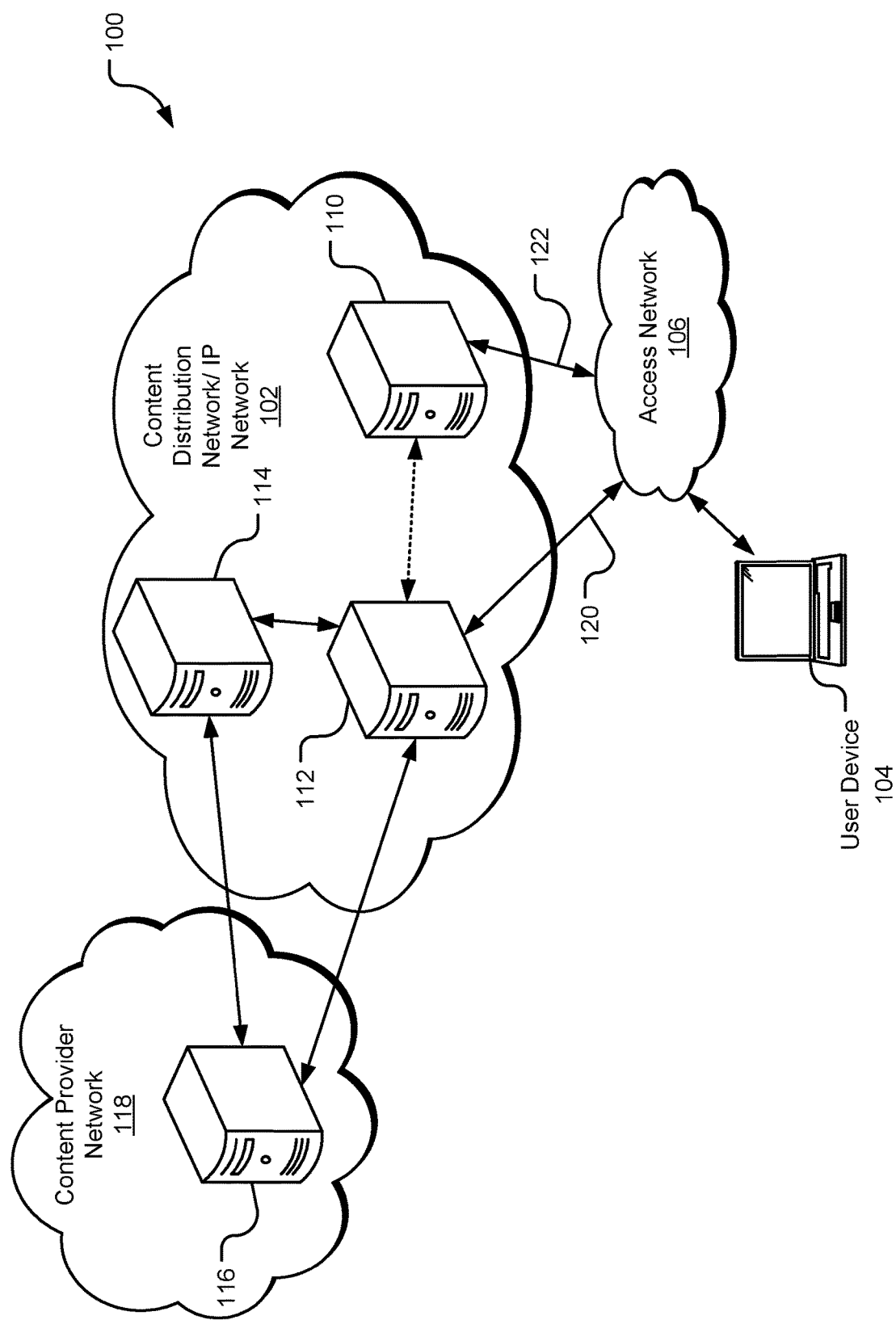
FIG. 1 is an example network environment for distributing content over a telecommunications network.

Aspects of the present disclosure involve systems, methods, computer program products, and the like, for utilizing multiple anycast addresses within a DNS architecture of a CDN. In general, one or more DNS servers of the architecture may announce a plurality of anycast addresses for receiving DNS requests from requesting devices. Anycast routing is a routing methodology in which a single destination Internet Protocol (IP) address is announced by multiple devices of a network such that multiple routing paths are available for a communication. Routers select a desired path to the destination device based on number of hops, distance, lowest cost, etc. A DNS architecture may utilize and announce, in one example, a group of 16 IP anycast addresses for receiving DNS requests. The group of addresses may be dispersed (and/or announced by) the DNS servers of the architecture such that each server announces a subset of the available addresses. In this manner, the group of IP addresses for the DNS architecture may be referred to as "anycast" addresses as each address may identify more than one server in the architecture. The number and identity of the subset of available anycast addresses may vary from server to server of the DNS architecture and may be determined based on groups of servers, configurations of metros or gateways of the DNS architecture, performance of one or more servers, and the like.

In some implementations, each server (in a group of servers) of the DNS architecture may announce a plurality of anycast addresses (instead of a single address) to other network devices to load balance DNS requests across the group of servers. Although some routers may include a load balancing feature for providing communications with an anycast destination address across the multiple servers, such load balancing is often limited to only a certain number of servers. Through the use of anycast addresses and, more particularly, spreading a group of anycast addresses across a group of servers such that each server announces a subset of the available anycast addresses, load balancing of DNS requests may occur across all of the servers in the group. In another example, a metro or gateway network configuration of the DNS network may include multiple routers in addition to the multiple DNS servers. Through the use of multiple anycast addresses, DNS requests may be spread across each server of the metro. In one particular example of a DNS architecture, the group of anycast addresses used by the architecture may be sliced among the servers of the metro (such that each server announces a portion or subset of the group of anycast addresses) to balance the requests among the servers. The use of multiple anycast addresses further provides for redirection of DNS requests to other servers within the metro in cases of server failure or overload conditions at a server of the metro.

Multiple anycast addresses in a DNS architecture also provides for load balancing and redirection of requests among multiple metros or gateways of the DNS network. For example, through the announcement and retraction of subsets of the group of anycast addresses for the DNS architecture, servers and/or routers of the DNS network may direct DNS requests to/from particular metros of the network to other metros of the network. Such redirection of DNS requests may occur in response to a detected overload condition at one or more servers of a metro and may be returned to the one or more servers when the overload condition is removed. Further, each router or server of the network may be configured to announce at least one of the group of anycast addresses such that each server is available to respond to DNS requests associated with the at least one anycast address. The determination of the subset of anycast addresses that each server of the architecture announces may be based, in one implementation, on a hashing function executed by each server such that a centralized controller may not be implemented in the architecture or network. As such, the servers and routers of the DNS architecture or configuration may utilize a group of anycast addresses to provide load balancing, overload response, and traffic management across each of the servers or metros of the DNS architecture to improve the response to DNS requests received at the architecture.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

FIG. 1 is an example network environment 100 for distributing content to one or more users. Although illustrated in FIG. 1 as a content delivery network, it should be appreciated that aspects of the present disclosure may apply to any type of network that utilizes network addressing (such as Internet Protocol (IP) addresses, media access control (MAC) addresses, domain names, etc.) for connecting an end user to one or more components of the network. For example, aspects of the disclosure may be utilized to connect a user of the network to a content server on which one or more content files is stored. Thus, although the CDN architecture is used throughout the document as the example network architecture through which aspects of the present disclosure may be applied; other network architectures and configurations are similarly contemplated.

In one implementation of the network environment 100, a CDN 102 is communicably coupled to one or more access networks 106. In general, the CDN 102 comprises one or more components configured to provide content to a device upon a request. The CDN may also include an underlying IP network through which the request is received and the content is provided. The underlying IP network associated with the CDN servers may be any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, including one or more domain name architectures, unless otherwise noted.

In one embodiment, a device 104 connects to the CDN 102 through one or more access networks 106 to request and receive content or content files from the CDN. The access network 106 may be under the control of or operated/maintained by one or more entities, such as, for example, one or more Internet Service Providers (ISPs) that provide access to the CDN 102. Thus, for example, the access network 106 may provide Internet access to a device 104. In addition, the access network 106 may include several connections to the IP network of the CDN 102. For example, access network 106 includes access point 120 and access point 122. Also, the device 104 may be connected to any number of access networks 106 such that access to the CDN 102 may occur through another access network. In general, access to a CDN 102 (or underlying IP network associated with the CDN) may occur through any number of ingress ports to the CDN through any number of access networks.

The CDN 102 is capable of providing content to a device 104, which is generally any form of computing device, such as a personal computer, mobile device, tablet, smart TV, or the like. Content may include, without limitation, videos, multimedia, images, audio files, text, documents, software, and other electronic resources. The device 104 is configured to request, receive, process, and present content. In one implementation, the device 104 includes an Internet browser application with which a link (e.g., a hyperlink) to a content item may be selected or otherwise entered, causing a request to be sent to a directory server 110 in the CDN 102.

The directory or authoritative server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the device 104 can retrieve the content. In some instances, the access network 106 may also include a DNS service. The directory server 110 may, in some instances, include several DNS servers arranged in a DNS architecture or system of servers to resolve domain names into IP addresses. The operation of the directory system 110 and access network 106 to resolve requests for content from the device 104 is discussed in more detail below with reference to FIG. 2.

In one implementation, the CDN 102 includes an edge server 112, which may cache content from another server to make it available in a more geographically or logically proximate location to the device 104. The edge server 112 may reduce network loads, optimize utilization of available capacity, lower delivery costs, and/or reduce content download time. The edge server 112 is configured to provide requested content to a requestor, which may be the device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the device 104 in response to the requests.

Figure 2:
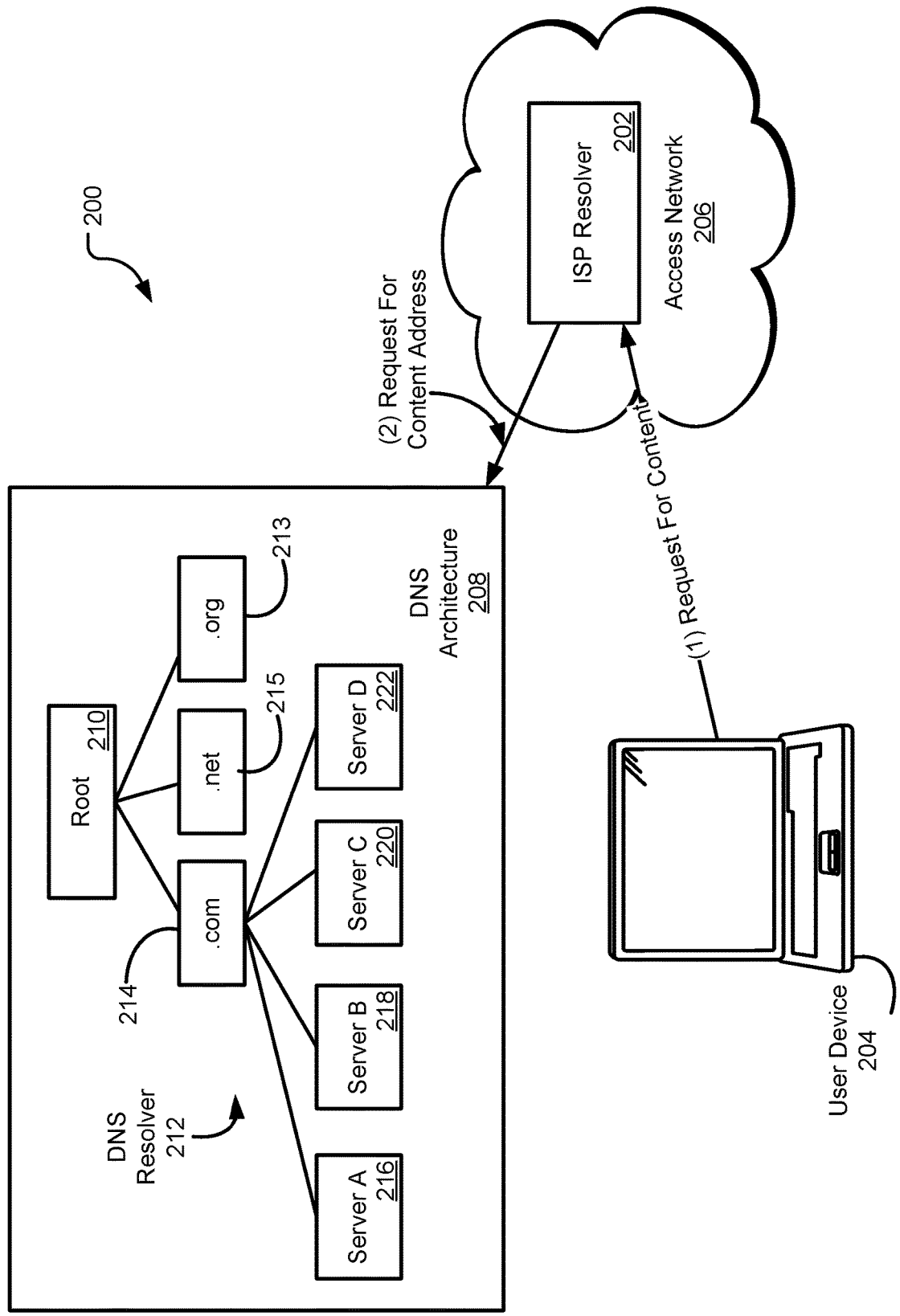
FIG. 2 is an example network environment of an authoritative domain name server (DNS) of a DNS architecture.

FIG. 2 is an example network environment of an authoritative domain name system (DNS) of a DNS architecture. The components of the network 200 are similar or the same as components discussed above with reference to the network 100 of FIG. 1. For example, the network environment 200 of FIG. 2 includes a user computing device 204, an access network 206 configured to provide access to a CDN for the computing device, and one or more DNS servers, discussed above. Other components of the network 200 of FIG. 2 may also be included in the network 100 environment of FIG. 1, if not explicitly shown in FIG. 1. The operation of the network 200 and components of the network of FIG. 2 are discussed below.

As mentioned above, a user of a CDN 102 may request content or a content file from the CDN. In one example, a user of the computing device 204 enters a link name (e.g., URL or other identifier) into a browser executed on the computing device. The link name is associated with a network address within the CDN at which the content may be obtained and provided to the computing device. For example, the user or the device may enter a URL such as http://www.example.com/content into the browser of the computing device 204. Upon entering the URL, the hostname may be extracted by the browser (www.example.com in this particular case), which then sends a request (possibly via a browser program executed on the computing device 204) to a DNS resolver 202 associated with the user's access network. The DNS resolver 202 associated with the user's access network is sometimes known as the ISP resolver. In one example, the access network ISP resolver 202 has cached an IP address for the provided URL at which the content available through that URL may be obtained. In other words, the ISP resolver 202 may return an IP address to the computing device 204 to which the computing device may follow to access the content of the URL.

However, while the ISP resolver 202 may be implemented to cache responses, the resolver often may not have a cached IP address for the provided domain name. The ISP resolver 202 may also maintain distinct caches for subsets of computing devices that use the resolver, and the subset used by computing device 204 may not have a cached IP address associated with the provided domain name, even though the resolver does have cached IP addresses for other subsets of computing devices. In such cases, the DNS resolver 202 transmits a second DNS request to a DNS architecture 208 of the CDN to receive an IP address at which the content file may be obtained. In some instances, the DNS request from the ISP resolver 202 may be transmitted to the DNS architecture 208 to determine the proper authoritative resolver or server within the architecture from which to obtain the IP address. In general, the DNS architecture 208 provides a root node hierarchy of DNS resolvers that respond to DNS requests by either responding with the IP address associated with the provided domain name or directing the requesting device 202 through the architecture to the corresponding or proper DNS resolver within the architecture. Through the DNS architecture 208, the DNS request from the ISP resolver 202 is fulfilled (i.e., the IP address associated with the request is provided to the ISP resolver). In turn, the ISP resolver 202 may cache the returned IP address for future requests received at the resolver and may provide the IP address to the computing device 204 in response to the DNS request.

More particularly, when the ISP resolver 202 does not have a cached IP address for the requested content within the CDN or does not know which DNS server may provide the IP address, the ISP resolver transmits a DNS request to the root node 210 or root server of the DNS architecture 208. The root node 210 may, in some instances, analyze the request and determine a type of URL included in the request. For example, the root node 210 may determine if the URL includes a ".com", ".net", ".org", etc. as a part of the entered URL. The DNS architecture 208 may include a DNS resolver 212 for each of the different types of URLs, such as a DNS resolver 213 for .org URL requests, a DNS resolver 215 for .net URL requests, a DNS resolver 214 for .com URL requests, and so on. In general, however, the DNS architecture 208 may be arranged in any manner with each DNS resolver handling any type of groups of DNS requests from requesting devices. Upon determining the type of URL requested, the root node 210 may return to the ISP resolver 202 a redirect to a corresponding DNS resolver within the architecture 208.

In one particular example, the ISP resolver 202 may receive a request from the device 204 that includes the URL www.example.com. If the ISP resolver 202 does not have an associated IP addressed cached, the resolver may transmit a second DNS request to the root node 210 of the DNS architecture 208 of the CDN. The root node 210 may analyze the request and determine the request includes a .com-type URL. The root node 210 may then return an IP address for another DNS server in the architecture 208 (in this case, DNS 214 for information concerning .com URLs) to the ISP resolver 202. The ISP resolver 202 may then transmit another DNS request to the .com server 214 and, in turn, may receive an IP address for yet another DNS in the architecture 214 in a similar manner as the root server 210. For example, the .com server 214 may analyze the request and determine that requests that include example.com may be fulfilled by a particular DNS 216 or by multiple DNS 218-222 in the architecture 208.

The ISP resolver 202 may continue sending DNS requests to the DNS architecture 208 until the DNS 216 corresponding to the received URL is located. In this manner, the ISP resolver 202 is directed to the DNS 216 within the architecture 208 for the particular URL and, once the IP address corresponding to the URL is obtained, the ISP resolver 202 may cache and/or provide the IP address to the computing device 204. With this information, the computing device 204 accesses a device within the CDN at the provided IP address and receives the requested content from the CDN.

As mentioned above, the DNS architecture 208 may include one or many servers that may resolve a DNS request for a particular request. For example, any of servers A-D 216-222 may resolve a request for URL example.com. In some instances, DNS 214 may return an IP address for each of Server A-D 216-222 to the ISP resolver 202 in response to a DNS request. The ISP resolver 202 may then determine which of the available DNS A-D 216-222 to transmit another DNS request to resolve the URL. In some networks, the DNS architecture 218 may be spread out throughout a network 102 to minimize transmission times for responding to DNS requests to a server. Thus, ISP resolver 202 may select the server from the pool of DNS A-D 216-222 that is geographically closest to the ISP resolver to transmit the next DNS request to obtain the related IP address. Regardless of which technique the ISP resolver 202 executes to select a particular DNS from the pool of DNS 216-222, the DNS architecture 208 may provide a plurality of addresses of DNS at which the DNS request may be resolved.

As CDNs continue to grow in size, the supporting DNS architecture 208 for the CDN may also grow in size such that more and more DNS may be included in the DNS architecture 208 to provide capacity and fast return times for DNS request. However, returning several addresses of DNS in response to a DNS request may not be scalable to match the growth of the CDN. As a result, new approaches for DNS network traffic management and DNS request handling have been developed, including utilizing load balancing and anycast techniques in an effort to reduce the size of results provided by the DNS system.

In anycast routing, many different devices on the Internet or other network may announce the same Internet Protocol (IP) address (e.g., 1.2.3.4) to which packets may be addressed for transmission. In other words, multiple devices within a network 102 may advertise the same anycast address such that packets with the anycast address (as the destination address) may be transmitted to any of the multiple devices. The decision on which of the multiple devices to which the packet is sent is left to other routing devices of the network 102, such as by determining which of the multiple devices is geographically closest to the transmitting device and routing the packet to that device. In regards to the DNS architecture 208 discussed above, DNS 214 may return an anycast address to the ISP resolver 202 in response to a DNS request indicating that the requested IP address may be obtained from any device associated with the anycast address. Server A-D 216-222 may each advertise the anycast address such that the ISP resolver 202 may then select one of server A-D to transmit the next DNS request. In this manner, the number of returned addresses for a DNS request may be reduced through the use of anycast addresses for multiple DNS of the architecture 208.

Figure 3A:
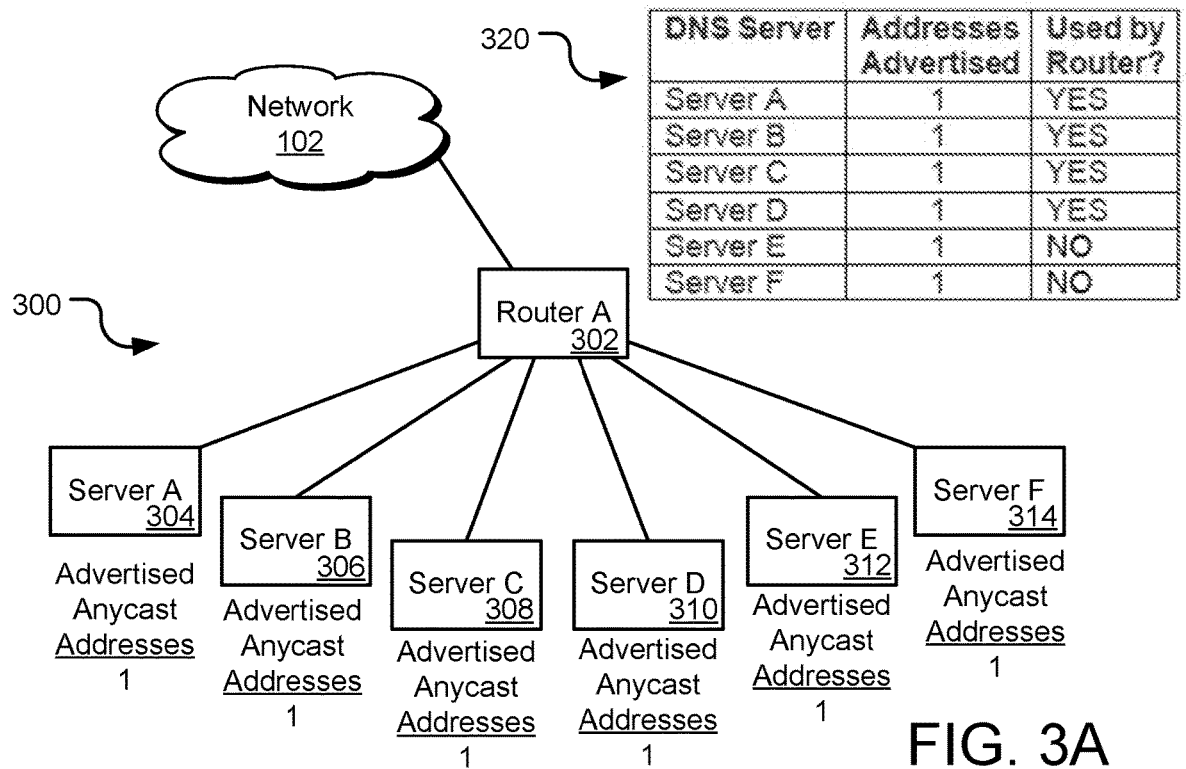
FIG. 3A is an example network environment for utilizing an anycast address for multiple DNS servers.

Although utilizing anycast techniques in a DNS architecture 208 may reduce the number of addresses returned in response to a DNS request, certain limitations to the effectiveness of typical anycast techniques may exist. For example, the use of a single anycast address for multiple servers may prevent efficient routing and load balancing of requests such that some servers may become overloaded with requests while others in the network remain idle. Such a limitation is illustrated in the network configuration 300 of FIG. 3A utilizing an anycast address for multiple DNS servers. The network environment 300 of FIG. 3A is an example deployment of one implementation of a portion of a DNS architecture 208 of the proposed system within a gateway to provide DNS resolution in a CDN 106.

In some network configurations, several domain name servers may be connected to a router. In the particular example of FIG. 3A, network environment 300 includes a plurality of domain name servers (Server A-Server F 304-314) in communication with router A 302. Router A 302 receives DNS requests from network 102 and provides the request to one of DNS servers 304-314 based on a network address or identifier announced by the servers 304-414. More particularly, the DNS architecture 208 of FIG. 2 may provide an anycast address to the ISP resolver 202 in response to a request to resolve a domain name. Each of the servers 304-314 of the network environment 300 of FIG. 3A may be associated with the anycast address provided to the ISP resolver 202. The resolver 202 may then transmit another DNS request to the network 102 with the anycast address as the destination address. As each of the servers 304-314 announce the same anycast address to receive communications, the network 102 may route the DNS request to router A 302 for forwarding on to one of the anycast DNS servers 304-314. The techniques by which the router 302 determines which of servers A-F 304-314 receive the DNS request is discussed in more detail below. Upon receipt of the DNS request, the receiving server may resolve the domain name to an IP address associated with the requested content and return the IP address to the ISP resolver 202 for further processing.

The network 102 (or more particularly, the components of the network) may receive addresses announced by the servers A-F 304-314 through one or more external border gateway protocol (EBGP) sessions between the servers and the router 302 and between the router 302 and the network 102. Through the EBGP session, each server 304-314 announces an address of the server for receiving communications from the network 102. The announcements are made with an associated router (such as nearest router A 302). The router 302 announces all received addresses to one or more components of network 102 such that the devices of the network may identify servers A-F 304-314 as destinations for communication that include a destination address associated with one or more of the servers. Although discussed within as utilizing EBGP techniques for address announcements, other techniques to announce routes between components of the systems disclosure herein may be used in implementations of the present disclosure. For example, in certain applications, a control system that injects BGP routes into an edge router or route reflector may also be used to announce routes and addresses of the networking devices.

In a typical anycast configuration, more than one device may announce the same address as capable of responding to a communication of the network 102. Thus, each of server A 304 through server F 314 may announce the same anycast address (referred to in FIG. 3A as anycast address 1). Router A 302 similarly announces the received anycast address 1 to network 102 as being connected to a device that may respond to a communication associated with the anycast address. The router A 302, upon receiving a communication with the anycast address as the destination address, may select from the available servers A-F 304-314 to transmit the communication. In one implementation, router A 302 may support Multipath Load Sharing. That is, if there are multiple EBGP sessions at the router 302 through which the router receives a route to the same anycast address, the router attempts to balance received traffic between each of the devices providing the same anycast address so as not to overload one of the destination servers 304-314. However, many load balancing routers 302 may only support a limited number of routes per anycast address or prefix. Thus, a given prefix/DNS IP address might only be able to have a limited number of load-balanced destinations. For purposes of example, router A 302 may be limited in supporting four destinations for a given address. As shown in table 320 of FIG. 3A, assume server A 304 through server F 314 each advertise anycast address 1 to router A 302 such that router A may select from each of servers A-F for a received communication associated with anycast address 1. However, router A 302 may be limited to four destinations for load balancing for a given address such that only server A 304, server B 306, server C 308, and server D 310 may receive communications from router A 302 for the anycast address. Server E 312 and server F 314, although available to receive DNS requests, may not be used as router A 302 limits the load balancing between server A 304 through server D 310. As such, the full capacity of the DNS architecture 208 or network configuration is not utilized.

Figure 3B:
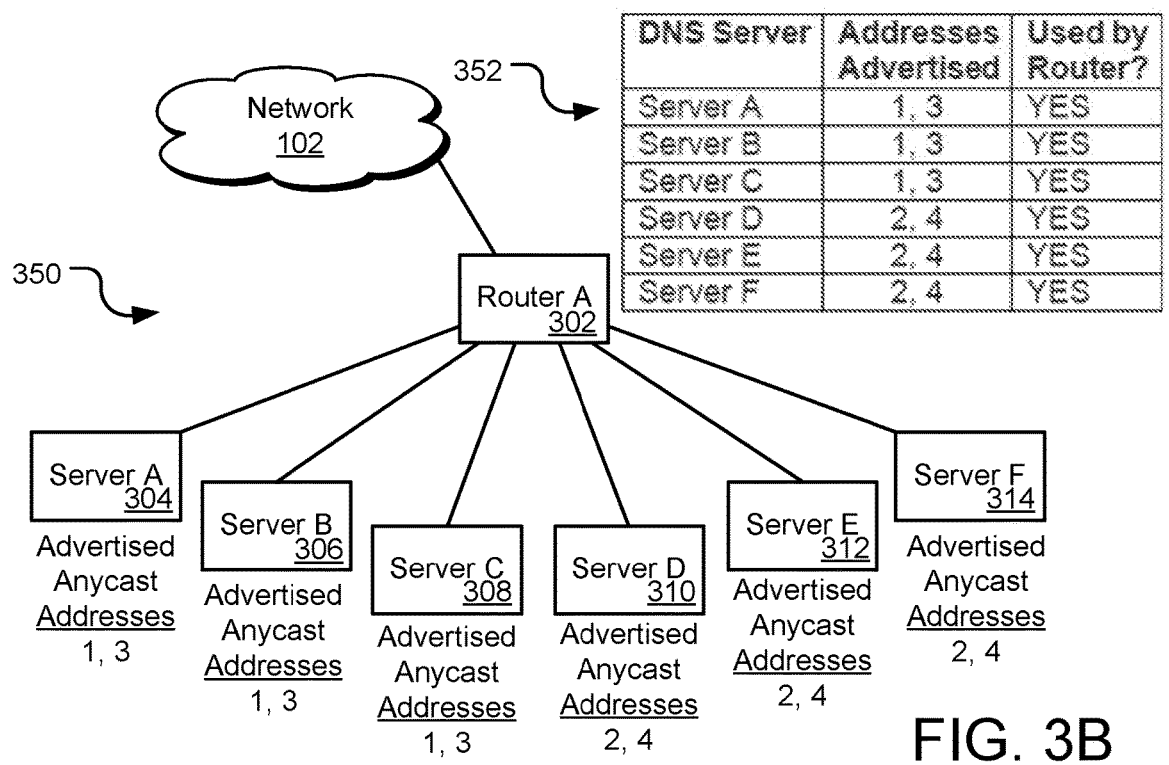
FIG. 3B is an example network environment for utilizing a plurality of anycast addresses for multiple DNS servers.

To resolve the issue of under-utilization of the network 300, multiple anycast address may be announced by the servers of the network environment. In particular, FIG. 3B is an example network environment for utilizing a plurality of anycast addresses for multiple DNS servers. The components of network environment 350 are the same or similar to that of FIG. 3A, including router A 302 connecting server A 304 through server F 314 to network 102. However, in this example, servers A-F 304-314 may announce multiple anycast addresses. In particular, four anycast addresses may be used and spread among the servers 304-314 behind router A 302. Although discussed as advertising four anycast addresses, it should be appreciated that any number of anycast addresses may be used by the environment 350 for any number of DNS servers serviced by a router 302. In the example shown, the four anycast addresses are announced by the servers 304-314 such that no address is announced by more than four servers (the limit for load balancing of router A 302). Thus, server A 304, server B 306, and server C 308 may announce both anycast address 1 and anycast address 3. These servers 304-308 may receive DNS requests with a destination address of anycast address 1 or anycast address 3. Similarly, server D 310, server E 312, and server F 314 may announce both anycast address 2 and anycast address 4 such that the servers 310-314 may receive DNS requests with a destination address of anycast address 2 or anycast address 4. Further, because the number of devices associated with any one of the anycast addresses does not exceed the limit for load balancing at the router A 302, each server 304-314 of the cluster of servers is utilized by the router. For example, requests destined for anycast address 1 may be equally distributed and handled by each of server A 304, server B 306, and server C 308, while requests destined for anycast address 2 may be equally distributed and handled by each of server D 310, server E 312, and server F 314. The use of multiple anycast addresses announced by a server of the cluster 304-314 may therefore result the utilization of all available servers behind router A 302, as shown in table 352 of FIG. 3B. Additional advantages for the use of multiple anycast addresses within a cluster are discussed in more detail below.

To determine which anycast addresses are advertised, each DNS server 304-314 may perform a repeatable and consistent hash-function that determines the advertised anycast addresses. For example, the hash-function may determine to one or more of the anycast addresses utilized by the DNS architecture 208 to begin advertising. In some instances, the hash-function may include as an input a number of servers in a cluster. For example, server A 304 may determine that six servers in total are connected to router A 302 and that four anycast addresses are available to advertise. Through the hash function, server A 304 may determine to advertise anycast addresses 1 and 3. The other servers B-F 306-314 may also execute the same hashing function to determine which anycast addresses to announce to generate the spread address distribution among the cluster of servers 304-314. Through the hashing function, the servers 304-314 may operate independently to determine the advertised addresses, although a centralized controller may be used to instruct one or more of the servers to announce particular anycast addresses.

Figure 4A:
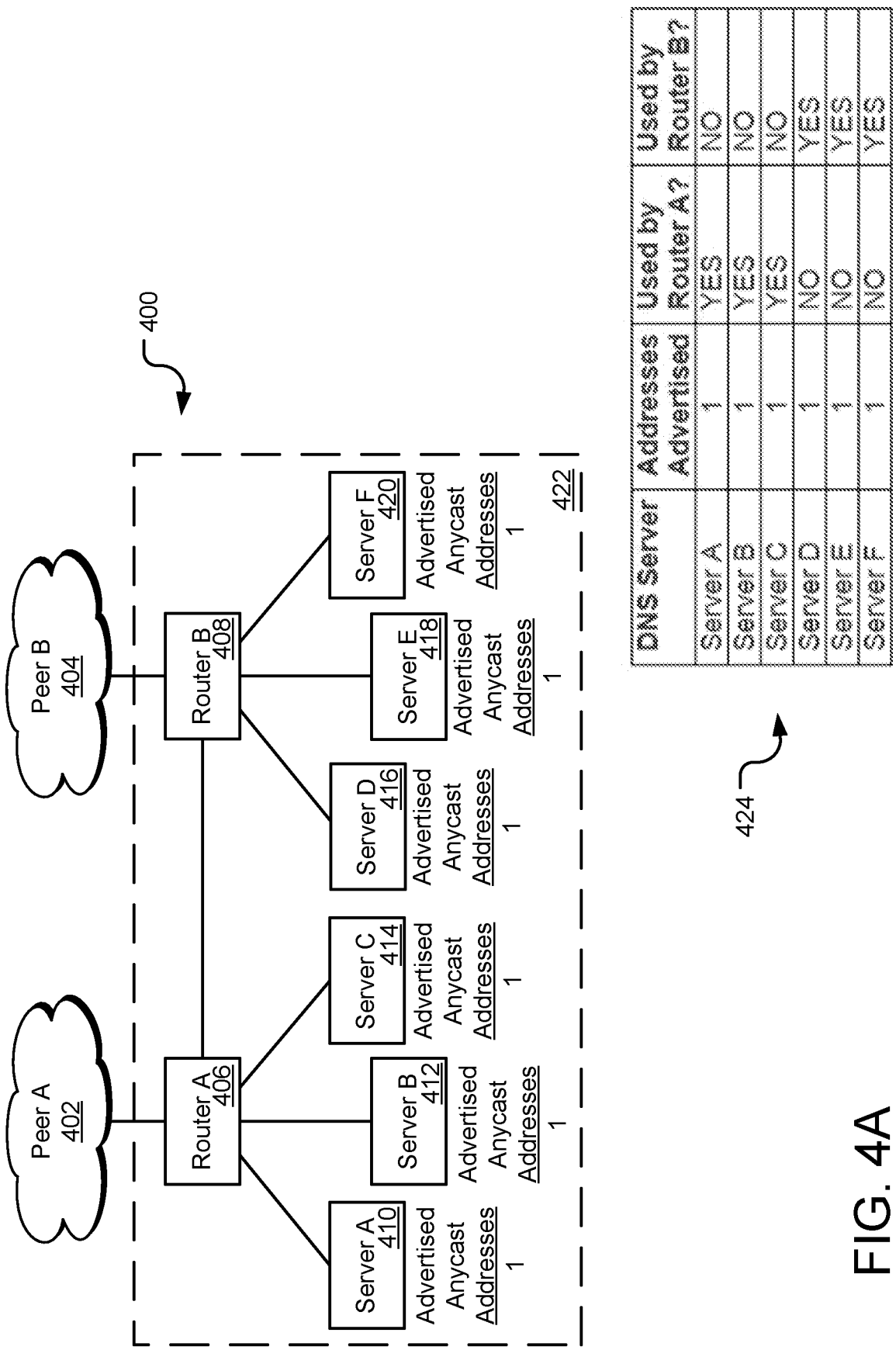
FIG. 4A is an example network environment for utilizing an anycast address for multiple DNS servers within the same metro.

In some network configurations, multiple routers or other networking devices may be located within a geographical area, sometimes referred to as a "metro". For example, a telecommunications network may locate several routers in a large city area, such as New York City. FIG. 4A is an example network environment 400 for utilizing an anycast address for multiple DNS servers 410-420 within the same metro area 422. The components of the network environment 400 may operate similar to that described above, such that multiple servers (e.g., server A 410 through server F 420) may receive and respond to DNS requests. Router A 406 and router B 408 may receive such DNS requests from one or more networks (illustrated as peer network A 402 and peer network B 404), identify the server indicated in the received request, and forward the request to the identified server. Router A 406 and router B 408 may also be in communication such that received communications may be transmitted between the routers.

Figure 4B:
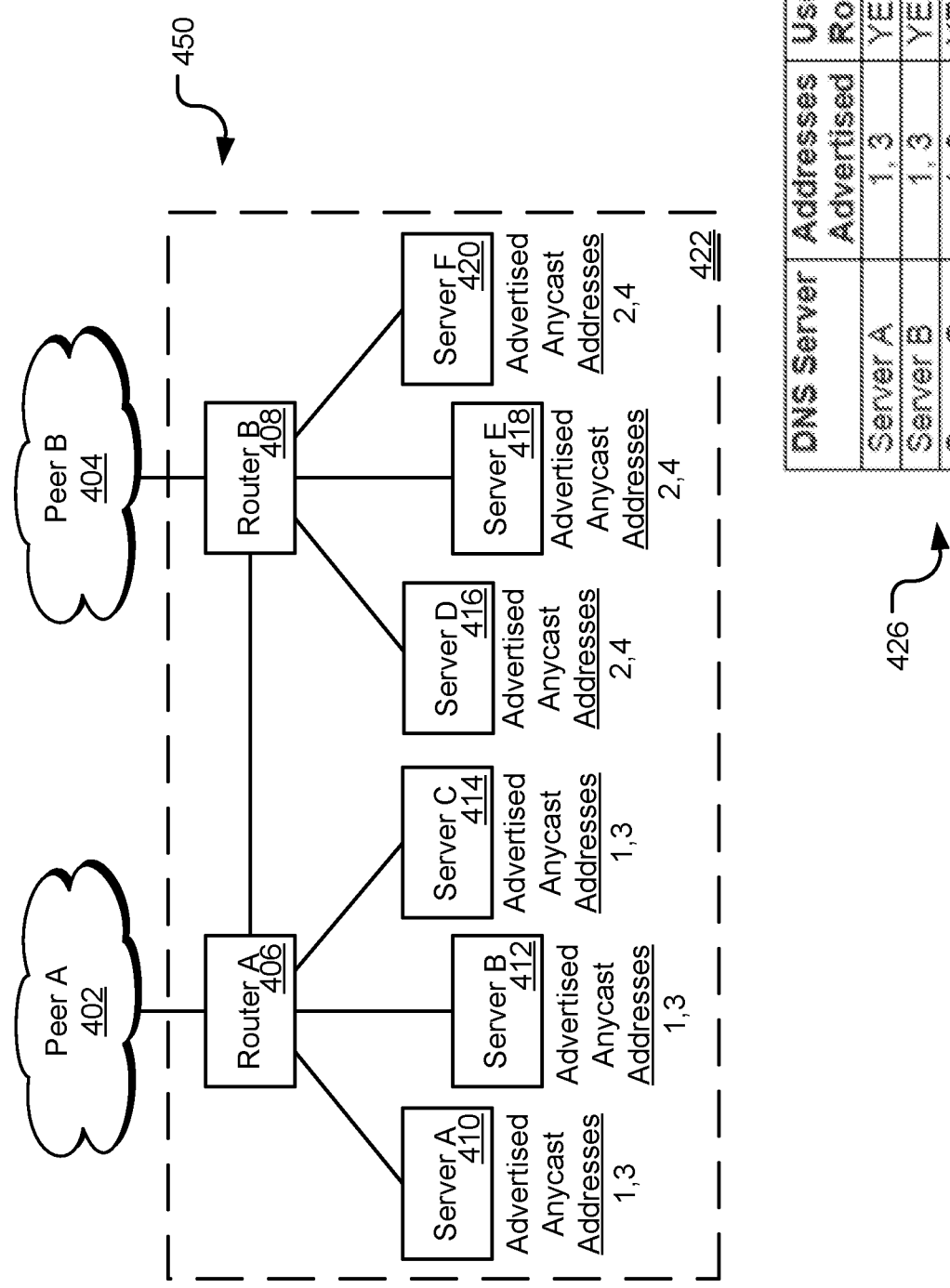
FIG. 4B is an example network environment for utilizing a plurality of anycast addresses for multiple DNS servers within the same metro or gateway.

In the particular environment 400 of FIG. 4B, server A 410, server B 412, and server C 414 are in communication with router A 406 and announce the anycast address 1 to router A. Router A 406 is in communication with a peer network A 402 to receive DNS requests from peer network A. As described above, router A 406 may load balance received DNS requests between server A 410 through server C 414 as each of the servers announces the same anycast address. Server D 416, server E 418, and server F 420 are in communication with router B 408 and also announce the anycast address 1 to router B. Router B 408 is in communication with a peer network B 404 to receive DNS requests from peer network B. Router B 408 may also load balance received DNS requests between server D 416 through server F 420 as each of the servers announces the same anycast address.

As shown in the table 424 of FIG. 4A, server A 410, server B 412, and server C 414 may be used by router A 406 for processing received DNS requests, while server D 416, server E 418, and server F 420 may be used by router B 408. If peer network A 402 provides a similar load of DNS requests as peer network B 404, then each server may process similar loads among all six DNS servers 410-420 as router A 406 and router B 408 may be configured to distribute DNS requests across available DNS servers. Further, although router A 406 may transmit received requests to router B 408 for transmission onto any of server D 416 through server F 420, each router may typically use the routes seen from the servers directly connected to the router due to a BGP path selection rules that prioritizes EBGP routes (e.g., routes received from the connected DNS servers) over internal BGP (IBGP) routes (e.g., routes received from other routers.

Although each server 410-420 of the metro 422 may be utilized by the network environment 400 to satisfy DNS requests, some issue may arise. For example, assume that all six servers 410-4120 represented receive an equal amount of traffic, but server A 410 goes offline or suffers some other reduction in performance level. In such a circumstance, server B 412 and server C 414 may begin receiving the traffic that was going to server A 410. As a result, server B 412 and server C 414 will experience an increase in traffic load, while server D 416 through server F 420 continue at the current load as none of the load previously being handled by server A 410 will be distributed to server B 412 and server C 414. This may reduce the effectiveness of server B 412 and server C 414 as the load within the metro 422 is not evenly distributed across all available servers. Another issue may arise from the traffic received from peer network A 402 and peer network B 404 being unbalanced. For example, peer network A 402 may be a larger CDN customer to the network 102 and provide significantly more requests to the metro 422 than peer network B 404. In such circumstances, all of the traffic transmitted to router A 406, which corresponds to the majority of traffic for the metro 422, may be transmitted to server A 410, server B 412, or server C 414, while servers D-F 416-420 handle a relatively small quantity of traffic. This unbalanced processing of received requests at the metro 422 network may not maximize the efficiency of the server capacity for the metro.

Employing multiple anycast addresses for the servers 410-420 of the metro 422 may aid in balancing the request traffic across all available servers. For example, FIG. 4B is an example network environment 400 for utilizing a plurality of anycast addresses for multiple DNS servers 410-420 within the same metro 422. The components of network environment 450 are the same or similar to that of FIG. 4A, including router A 406 connected to servers A-C 410-414 and router B 408 connected to servers D-F 416-420, with router A 406 in communication with peer network A 402 and router B 408 in communication with peer network B 404. However, in this example, servers A-F 410-420 may announce multiple anycast addresses. In particular, four anycast addresses may be used and announced by the servers 410-420 in a similar announcing scheme as discussed above. The multiple anycast addresses may aid in load balancing DNS requests across the DNS servers 410-420 of the metro 422.

In particular, as shown in table 426, server A 410, server B 412, and server C 414 may announce anycast addresses 1 and 3, while server D 416, server E 418, and server F 420 may announce anycast addresses 2 and 4. Similar to above, each router 406, 408 may load balance requests to those servers respectively connected to the routers. Further, because router A 406 is connected to router B 408, requests received at either router may be spread across all of the available servers 410-420. In particular, router A 406 may receive a DNS request from peer network A 402 with a destination address of anycast address 2. Because none of server A-C 410-414 announce anycast address 2, router A 406 may transmit the request to router B 408 (as router B may have received anycast address 2 from servers D-F 416-420 and announced anycast address 2 to router A). In this manner, router A 406 may utilize the servers D-F 416-420 behind router B 408 for DNS requests associated with anycast address 2 or anycast address 4. Similarly, router B 408 may utilize the servers A-C 410-414 behind router A 406 for DNS requests associated with anycast address 1 or anycast address 3. Thus, each of router A 406 and router B 408 may utilize each of the servers 410-420 of the metro 422 to resolve received DNS requests, whether received from peer network A 402 at router A or peer network B 404 at router B. The DNS requests may thus be load balanced across all of the available servers 410-420, regardless of which peer network 402-404 or through which router 406-408 the request is received.

Figure 4C:
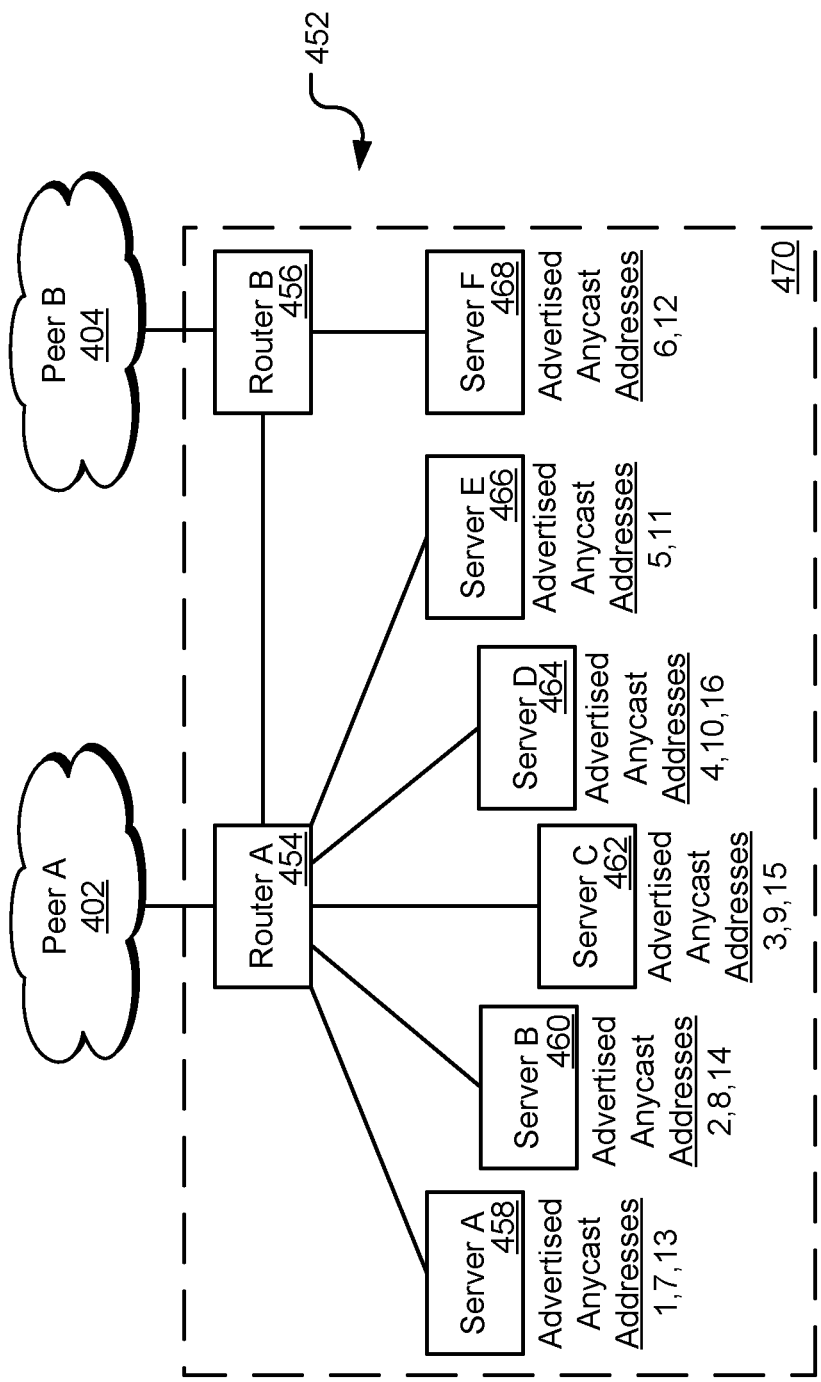
FIG. 4C is an example network environment for utilizing a plurality of anycast addresses for multiple DNS servers within the same metro by splicing the plurality of anycast addresses across the multiple DNS servers.

Other network environments may utilize multi-anycast addressing schemes or techniques to improve DNS request handling within a metro. For example, FIG. 4C is an example network environment 452 for utilizing a plurality of anycast addresses for multiple DNS servers 458-468 within the same metro 470 by splicing the plurality of anycast addresses across the multiple DNS servers. In this configuration, router A 454 may be connected to peer network A 402 and router B 456 may be connected to peer network B 404 as above. However, DNS servers A-E 458-466 may be connected to router A 454 while DNS server F 468 may be connected to router B 456. Thus, router A 454 may serve requests to five servers, while router B 456 transmits request to one server. Each of the DNS servers A-E 458-466 may be configured to announce multiple anycast addresses for receiving DNS requests. In the network environment 452 illustrated, however, the announcement of the anycast addresses may be spliced among the available servers in a round-robin fashion. For example, assume a DNS architecture that utilizes 16 different anycast addresses for use in reaching DNS servers of the architecture. In the particular configuration of FIG. 4C, server A 458 may announce anycast addresses 1, 7, and 13, server B 460 may announce anycast addresses 2, 8, and 14, server C 462 may announce anycast addresses 3, 9, and 15, server D 464 may announce anycast addresses 4, 10, and 16, server E 466 may announce anycast addresses 5 and 11, and server F 468 may announce anycast addresses 6 and 12. By slicing the multiple anycast addresses across the servers A-F 458-468, traffic load may be spread across the servers, regardless of which peer network 402, 404 from which the traffic is received and which router 454, 456 receives the traffic. In particular, server A 458 may process DNS requests associated with the anycast address 1, server B 460 may process DNS requests associated with the anycast address 2, server C 462 may process DNS requests associated with the anycast address 3, and so on. By slicing the anycast addresses that are announced by the servers A-F 458-468, the load of DNS request responses may be spread across all of the available servers of the metro 470.

Figure 5A:
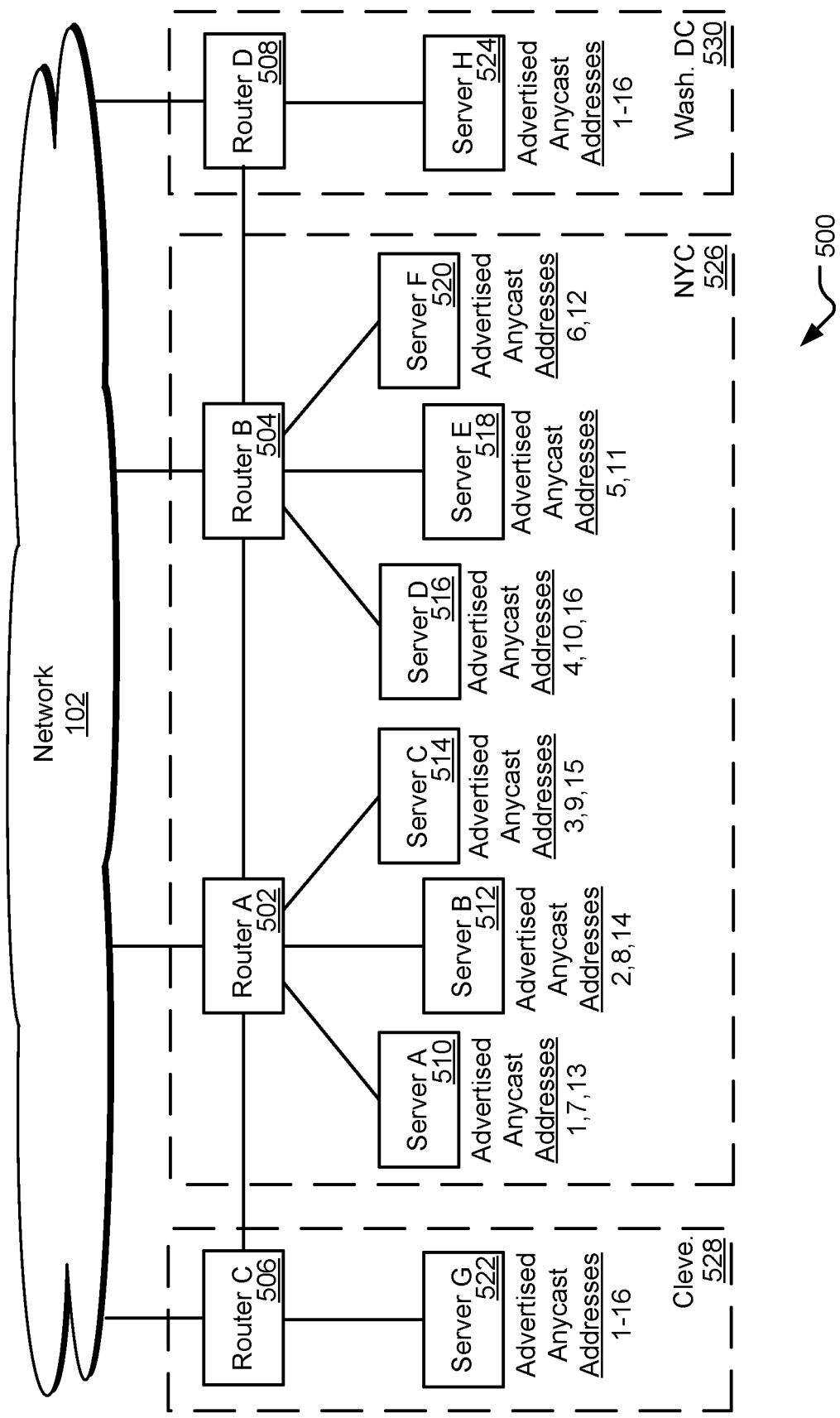
FIG. 5A is an example network environment for utilizing a plurality of anycast addresses for multiple DNS servers within multiple metros or gateways.

In a similar manner, DNS request traffic loads may be spread across multiple metros of a telecommunications network. Different metros of a telecommunications network may experience different loads and may not be able to redistribute traffic to prevent overloading of devices, such as routers or servers, of the metro. Such uneven loading may be particularly problematic during a distributed denial of service (DDoS) or similar attack, when an operator could benefit from using all available capacity of a network to handle the sharp increase in traffic resulting from the attack. FIG. 5A illustrates an example network environment 500 for utilizing a plurality of anycast addresses for multiple DNS servers 510-524 within multiple metros 526-530 or gateways. In particular, the network environment 500 includes a first metro 562 or gateway (located in New York City in this example). The NYC metro 562 includes a first router (router A 502) connected logically between multiple DNS servers A-C 510-514 and a network 102. A second router (router B 504) may also be connected between multiple other DNS servers D-F 516-520 and the network 102. Further, sixteen anycast addresses utilized by a DNS architecture 208 to which the DNS servers 510-520 belong may also be spliced across the six servers of the NYC metro 526, as described above. The network environment 500 also includes a second metro 528, located in Cleveland in this example. The Cleveland metro 528 includes a router (router C 506) connected to DNS server G 522. Server G 522 may announce anycast addresses 1-16 such that all DNS requests received at router C 506 are transmitted to server G 522 for resolution. A third metro 530, located in Washington D.C. in this example, similarly includes a DNS server (server H 524) connected to router D 508. Each router A-D 502-508 is connected to the other routers of the environment 500. Although shown as being directly connected, it should be appreciated that routers A-D 502-508 may connect over network 102 for transmissions of communications between the routers. Server H 524 may similarly announce anycast addresses 1-16 such that all DNS requests received at router D 508 may be resolved by server H 524.

In the example environment 500, DNS requests are load balanced across the servers within a particular metro 526-530. For example, because only one DNS server 522 is located in the Cleveland metro 528, all requests received in the Cleveland metro may be transmitted to server G 522 for resolution and response. On the other hand, the NYC metro 526 includes six servers 510-520 that can handle DNS requests. The anycast addresses utilized by the DNS architecture 208 may be spread out among the servers 510-520 of the NYC metro to load balance the requests among the available servers in that metro.

Figure 5B:
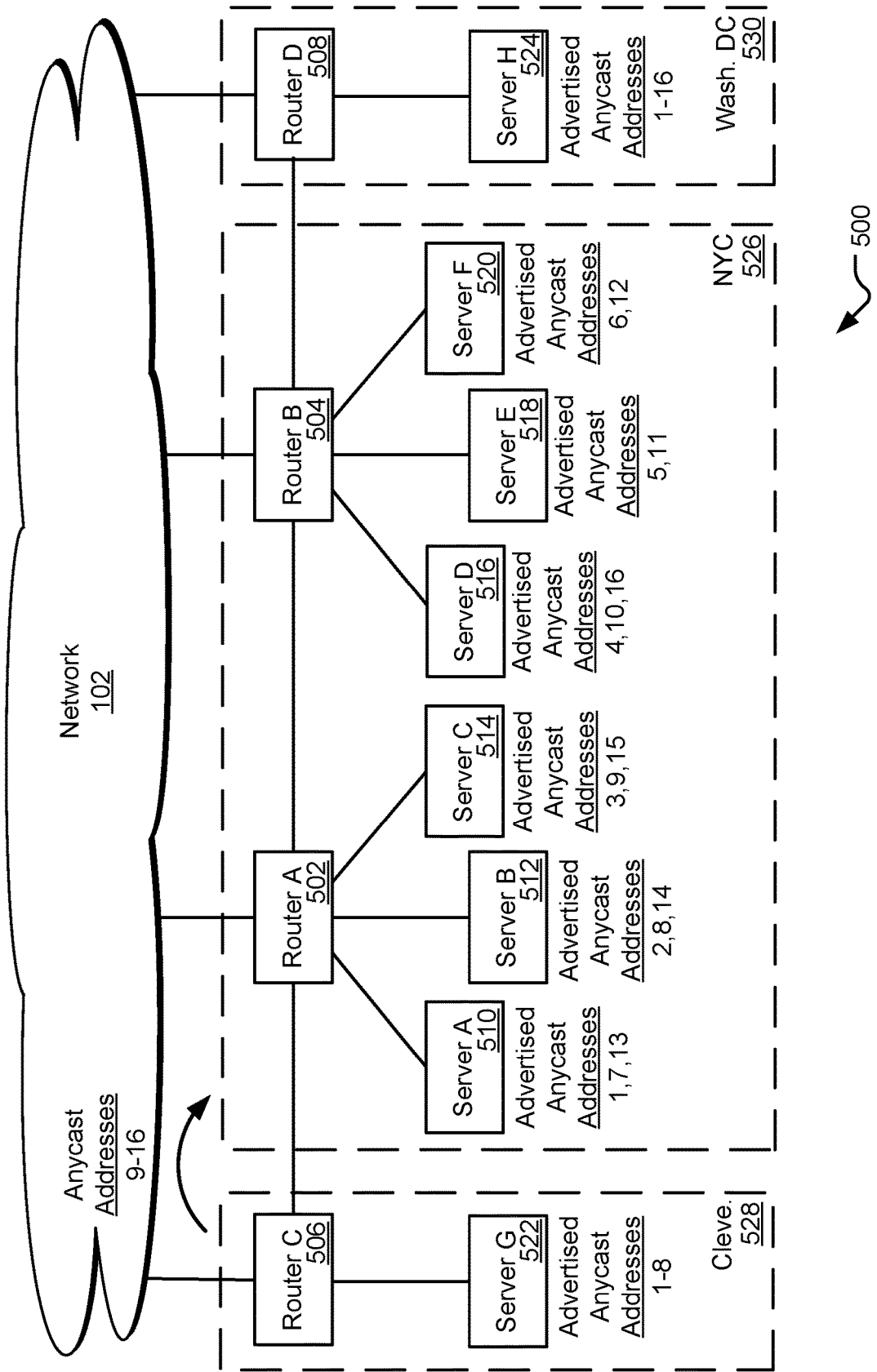
FIG. 5B is the example network environment of FIG. 5A limiting anycast addresses for a metro of the multiple metros.

In some instances, one or more of the servers 510-524 of the network environment 500 may become overloaded with requests. This may occur for many reasons, such as due to a denial of service attack or an unusual demand for domain name resolution. When a potential overload condition is detected at one or more of the DNS servers 510-524 of the environment 500, the overloaded server or servers may cease announcing one or more of the previously announced anycast addresses to redirect those requests to other servers/routers of the environment 500. For example, assume server G 522 (or a central monitoring device) detects a potential traffic overload condition at server G. The overload condition may be detected in many ways, including but not limited to, a rate of received traffic meeting or exceeding a threshold, a forecast of future received traffic based on current trends of received traffic, detected attacks on one or more components of the network 500, information or data received from the network 102 or an administrator of the network, and the like. Regardless of how an overload condition of a server is determined, the server 522 that is overloaded or may become overloaded may cease announcing one or more of the anycast addresses to redirect requests associated with those addresses to other servers in the environment 500. For example, server G 522 may cease announcing anycast addresses 9-16, as shown in the network configuration of FIG. 5B. In other words, server G 522 may only announce anycast addresses 1-8 in response to the detected overload condition, when previously the server announced anycast addresses 1-16. The stopping of announcements for anycast address 9-16 may be detected by router C 506 (such as through standard BGP announcement procedures) such that router C 506 may, when DNS requests are received at router C 506 from network 102 associated with any of anycast address 9-16, router C 506 may transmit the requests to another router within the environment 500. For example, router C 506 may transmit requests associated with anycast addresses 9-16 to the NYC metro 526 for processing. Requests associated with anycast addresses 9, 13, 14, and 15 may be transmitted to router A 502 (based on announced anycast address 13 from server A 510, announced anycast address 14 from server B 512, or anycast address 9 and 15 from server C 514). Requests associated with anycast addresses 10-12 and 16 may be transmitted to router B 5045 (based on announced anycast address 10 and 16 from server D 516, announced anycast address 11 from server E 518, or anycast address 12 from server F 520). In this manner, server G 522 may attempt to redirect traffic, and thereby lessen the traffic load condition at server G, to other routers 502, 504 in the network environment 500 in response to a detected overload condition.

Other servers may also redirect traffic to other routers in response to a detected overload condition. For example, server A 510 may, upon detection of an overload condition, may cease advertising anycast address 13 to reduce the flow of request traffic to the server. Other servers of the environment 500 may then respond to DNS requests associated with anycast address 13, such as server G 522 of Cleveland metro 528 or server H 524 of a Washington D.C. metro 530. Further still, other servers 512-520 within the NYC metro 526 may begin announcing anycast address 13 to begin receiving such DNS requests to take the load from server A 510. For example, server E 518 may begin announcing anycast address 13 to begin receiving those DNS requests. If the overload condition persists, server A 510 may also cease announcing another anycast address, such as anycast address 7. By ceasing announcements of particular anycast address, overloaded servers may begin to shed traffic to other servers of the DNS architecture until the overload condition ends.

To determine which anycast addresses the server 522 may cease advertising, DNS servers 510-524 may perform a repeatable and consistent hash-function that determines which of the advertised anycast addresses to stop advertising. For example, the hash-function may determine to stop advertising the highest anycast address being broadcast when the overload condition is determined. Another hash-function may include as an input which anycast addresses are announced within the same metro as the overloaded server such that the anycast address that is shed by the overloaded server is at least partially based on whether other servers in the metro also advertise the anycast address. In some instances, it may be desirable to shed traffic to other metros, even when the metro may be geographically further away from the requesting device. The requesting device (such as ISP resolver 202) generally selects the DNS server that is geographically nearest the requesting device. Thus, if server G 522 of the Cleveland metro 528 sheds anycast addresses by ceasing to advertise addresses (such as anycast addresses 9-16), the requesting device may determine that the servers 510-520 in the New York metro 526 and route the DNS request to the nearest router in that metro. In this manner, the DNS servers 510-524 of the network environment 500 may respond to overloaded conditions by shedding traffic to other servers in other metros 526-530 within the environment. Further, unlike typical load balancing done with DNS servers, load balancing here is performed via BGP so delays are minimized (as BGP typically operates within seconds) and each server may operate independently.

Although servers 510-524 within the environment 500 may shed or cease advertising anycast addresses, the network 500 may not want idle routers or servers that do not announce any anycast address. For example, while server G 522 may shed DNS requests to the NYC metro 526 (or other metros) in response to an overload condition, ceasing to announce all anycast addresses from server G 522 may result in the server becoming idle or receiving no DNS requests. Similarly, router C 506 may also become idle based on server G 522 ceasing announcement of anycast addresses. To prevent idle components of the network 500, each server may be associated or programmed with a default or preferred anycast address from the range of available anycast addresses. The preferred anycast address may be based on the router to which a given server is connected such that more than one server may be associated with the preferred anycast address. In general, each server associated with a given router always advertises the preferred anycast address for that router so that at least one address is advertised for each router of the network 500. By always advertising at least a preferred anycast address, the routers 502-508 of the network 500 may continue to receive DNS requests.

Figure 5C:
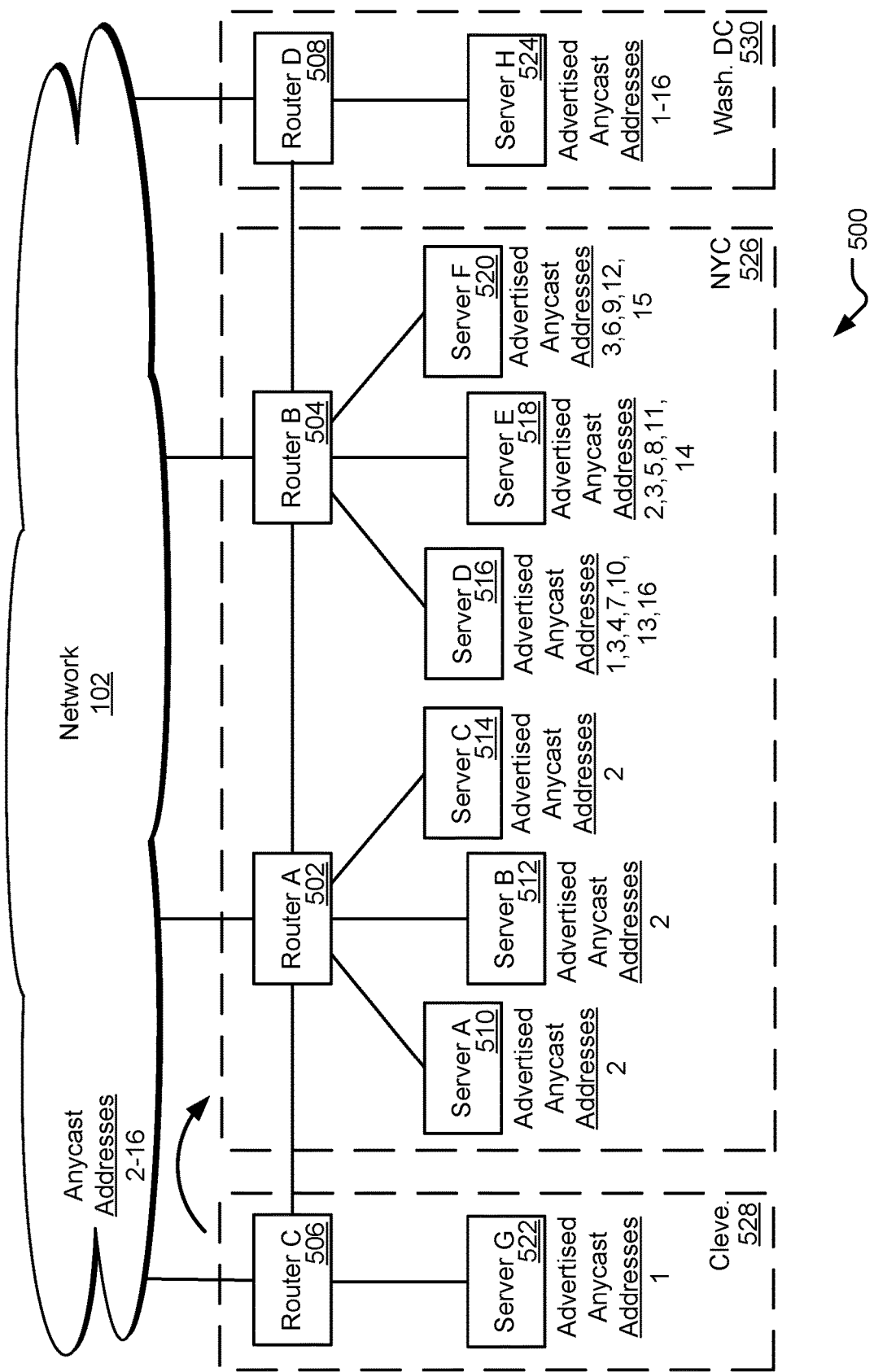
FIG. 5C is the example network environment of FIG. 5A in response to one or more overload conditions at one or more of the multiple DNS servers by announcing one or more preferred anycast addresses.

FIG. 5C is the example network environment 500 of FIG. 5A in response to one or more overload conditions at one or more of the multiple DNS servers by announcing one or more preferred anycast addresses. In this example of the network 500, server G 522 of the Cleveland metro 528 may detect an overload condition and cease announcing one or more anycast addresses to reduce the DNS request traffic transmitted to server G 522 via router C 506. As the overload condition increases or continues, server G 522 may shed more and more anycast addresses until a single anycast address is advertised by the server. Router C 506 of the Cleveland metro 528 may also be associated with a preferred anycast address such that servers connected to router C 506 may announce the preferred anycast address, regardless of a detected overload condition at the server. In the example shown in FIG. 5C, the preferred anycast address for router C 506 may be anycast address 1. Thus, server G 522 may continue to announce anycast address 1 despite a detected overload condition at the server. In general, any of the available anycast address for the DNS architecture 208 may be associated with a particular router of the network 500 as the preferred address for that router. The preferred anycast address for a particular router may be determined or provided by a central controller or an administrator of the network 102 upon configuration of the network environment 500. The servers associated with the particular router may be configured as discussed below to store and announce the preferred address for that router.

Continuing the above example, overload conditions may also be detected at server A 510, server B 512, and server C 514 at the NYC metro 526. In response, servers A-C 510-514 may also shed addresses to other servers in the network 500. In one example, servers D-F 516-520 in the NYC metro 526 may begin announcing the shed anycast addresses from servers A-C 510-514. In another example, the DNS request traffic may be redirected to server H 524 of the Washington D.C. metro 320 based on the anycast addresses announced by server H 524. Regardless of to which servers the requests are redirected, servers A-C 510-514 may continue to shed addresses for the duration of the overload condition. However, servers A-C 510-514 may not cease announcing the preferred anycast address associated with router A 502 to which the servers are connected. In the example of FIG. 5C, router A 502 has an associated preferred anycast address of address 2 such that servers A-C 510-514 continue to announce the preferred address despite the overloaded condition at those servers. In a similar manner, router B 504 may also be associated with a preferred address (such as anycast address 3) and router D 508 may be associated with a preferred address (such as anycast address 4). The servers connected to or otherwise associated with those routers 504, 508 may announce the preferred address. Notably, it is possible to reuse preferred addresses in certain situations such as when they are used for locations far apart (e.g., different continents).

Figure 5D:
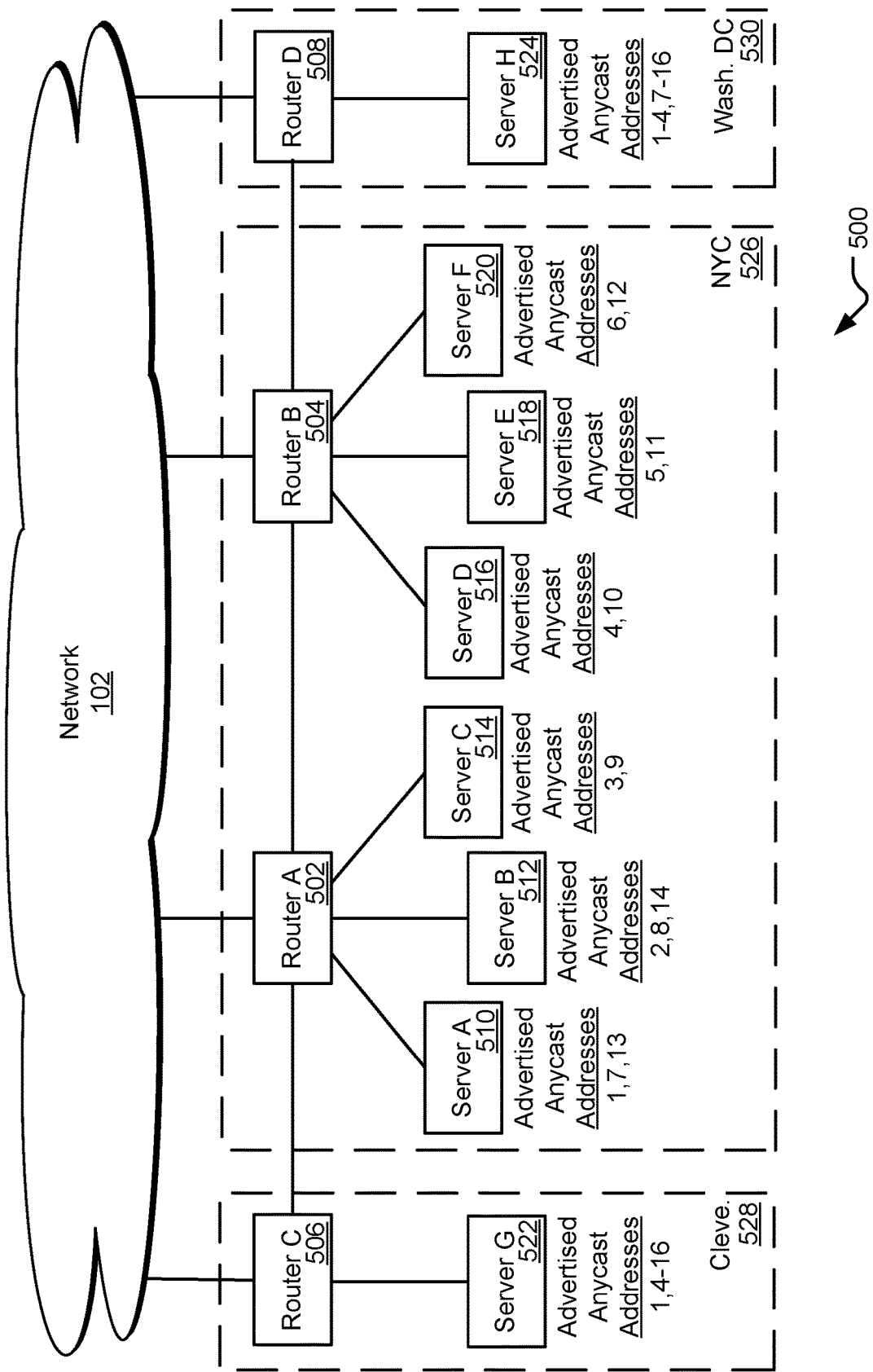
FIG. 5D is the example network environment of FIG. 5A limiting one or more anycast addresses for the multiple metros.

Another issue that may arise when utilizing anycast addressing in a DNS architecture 208 is the potential for a router or other networking component "black-holing" some requests. Black-holing of requests occurs when a router or other component advertise one or more addresses for resolution by a server behind the router, but no server may be available to respond to the request, due to a malfunctioning server or other failure of the devices, such that the request goes unanswered. To mitigate this circumstance, some anycast addresses may be excluded from one or more metros or routers. For example, FIG. 5D is the example network environment 500 of FIG. 5A limiting one or more anycast addresses for the multiple metros 526-530. In the example shown, the routers/servers of the NYC metro 526 may not announce one or more anycast addresses, such as anycast address 15 and anycast address 16. Rather, those addresses may be announced from other metros, such as Cleveland metro 528 and/or Washington D.C. metro 530. Thus, if it is determined that DNS requests associated with address 15 and address 16 are not being responded to from the NYC metro 526, such addresses may be removed from announcements from router A 502 and router B 504 (or the related servers 510-520 of the metro 526). Similarly, anycast address 2 and anycast address 3 may be excluded from Cleveland metro 528 such that those requests may be answered by the NYC metro 526 and/or the Washington D.C. metro 530. The alternate metros 526-530 to respond to particular DNS requests may be, but are not necessarily, geographically close to the excluded metro such that the response for DNS requests may still be relatively fast. Through the exclusion of one or more anycast addresses from one or more metros 526-530 of the environment 500, dead or black-hole devices of the network 500 may be avoided. The exclusion of one or more anycast addresses from a metro 526-530 may also be utilized during load balancing within a metro. For example, non-preferred addressed may be pooled in metros which have similar delays. As servers begin shedding addresses due to overloading, the other servers in the same metro 526 may also cease advertising the shed address of the server as the servers within a metro may be treated as a "pool" of servers. For example, server A 510 and server B 512 may both advertise anycast address 10 in NYC metro 526. If server A 510 sheds anycast address 10 due to overloading, server B 512 may also be configured to shed anycast address 10 such that no server in NYC metro 526 advertises that address. Rather, DNS requests associated with anycast address 10 may then be transmitted to Cleveland metro 528 or Washington D.C. metro 530, assuming those metros continue to advertise the anycast address 10. As mentioned above, however, servers may refrain from advertising a preferred anycast address for the router to which the server is connected.

In some circumstances, a BGP session may stop working properly, such as if a router filters out all advertised addresses received from a DNS server but keeps the session up. When this occurs, a connected DNS server may have no way of knowing internally that such a situation has occurred and the addresses are not being announced. Other examples of problematic situations that may arise are when the router isn't accepting any routes or when the router is accepting routes, but something is wrong within a metro such that traffic that should stay local is instead exported to another metro.

Figure 6:
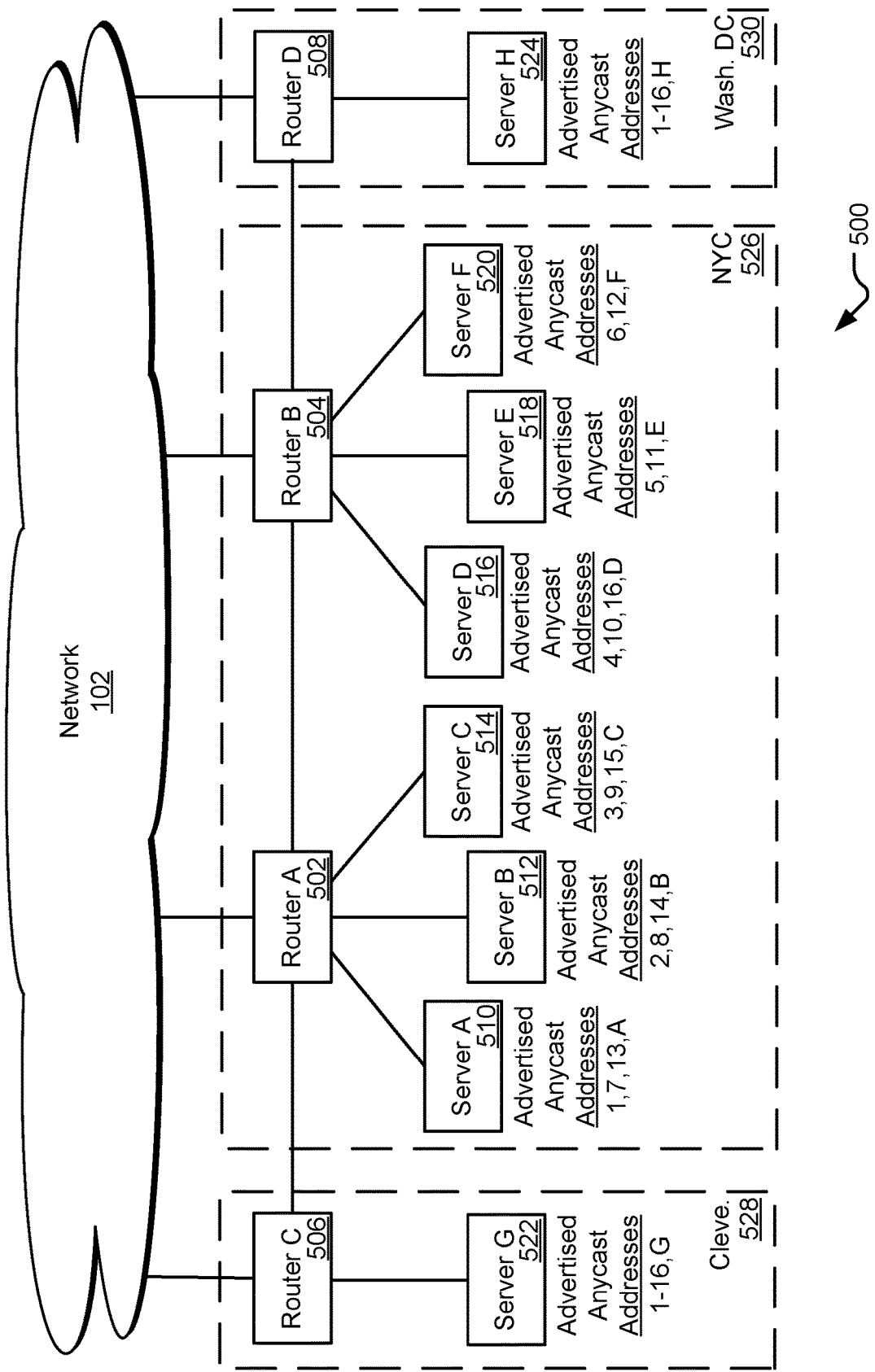
FIG. 6 is the example network environment of FIG. 5A, with each of the multiple DNS servers advertising a unique anycast address to monitor the server performance.

The network environment may implement mechanisms and techniques for addressing such circumstances. In one implementation, a unique monitoring address may be assigned to each server within the network to monitor the functionality of the server. FIG. 6 is the example network environment 500 of FIG. 5A, with each of the multiple DNS servers 510-524 advertising a unique anycast address to monitor the server performance of each server. In particular, server A 510 may advertise IP address A, server B 512 may advertise IP address B, server C 514 may advertise IP address C, and so on for each server in the DNS network 500. IP address A, IP address B, IP address C, etc. may be unique IP addresses, different than the anycast addresses utilized by the DNS network 500. Each unique address is announced via BGP such that the unique IP address may be used to monitor the respective server from the entire network 102 to ensure that the BGP session is functioning properly. In particular, if a unique IP address cannot be reached by the network 102, an error may be raised to examine the respective server to check for failures at the server. In this manner, monitoring for the unique IP address announced by each server 510-524 of the network 500 may provide an indication of the operability of the servers.

Another mechanism that may be implemented in the network 500 is monitoring of DNS pool addresses within a metro. For example, where more than one DNS server is in a metro (such as server A-F 510-520 of NYC metro 526), all DNS pool unique IP addresses assigned to servers within the same metro may be monitored from the other DNS servers in that metro 526 to ensure they are answered within the metro. In one example, this may be accomplished using a DNS lookup technique using the anycast address that returns the hostname/"a-name" of the responding server. If the responding server is not a machine in the same metro or the address is completely unreachable, an error may be raised. Such a mechanism may be implemented in conjunction with or independently of the dedicated monitoring IP addresses discussed above.

The network configurations discussed above may be implemented in several ways to provide the multiple anycast address announcements of the DNS servers of the DNS architecture 208. For example, the components of the network, including the routers and DNS servers, may be implemented to support both IPv4 and IPv6 protocols. Further, in some implementations, specific data may be provided to each DNS server within the network 208 to facilitate the previously discussed functionality. For example, a central computing system may be used to manage configuration data of the components of the network 208, which may then be pushed out to each of the DNS servers within the architecture. Examples of configuration data that may be provided to each of the DNS servers may include, without limitation, host flags for each of a group name of a group to which the receiving DNS server belongs, BGP peer IP addresses (e.g., IPv4 and IPv6), a BGP self-autonomous system number (ASN), a BGP peer ASN, an IPv4 monitoring IP address, and an IPv6 monitoring address. Configuration information may also be maintained for each group of DNS servers (e.g., each set of DNS servers coupled to a given router). Such group configuration information may include a preferred IPv4 and/or IPv6 address for the group. As previously discussed, such a preferred address may generally correspond to an anycast address that each DNS server within the group advertises. Global configuration data that may be stored and maintained may include a list of IP addresses to include in a given pool. In certain implementations, such a list may allow at least 64 anycast addresses for each IPv4 and IPv6 and should generally allow non-contiguous addresses. Additional configuration data may be maintained on a per-metro basis. For example, such information may include a list of anycast addresses to be excluded from a given metro In some implementations, when establishing a new group or an initial set of DNS servers on a given router, a unique "preferred pool anycast address" may be assigned to the group. Such a preferred pool address may be provided for each protocol supported (e.g., each of IPv4 and IPv6). In general, the preferred pool anycast address may be any pool address not used by another group as a pool anycast address. Further, as previously noted, certain anycast addresses may be excluded from a given metro. Accordingly, configuration of the system may include identifying the particular anycast addresses to be excluded from each metro within the system. In systems supporting multiple protocols, addresses may be excluded for each protocol. So, for example, in systems supporting both IPv4 and IPv6, excluding a given exclusion may include exclusion of each an IPv4 address and an IPv6 address. In certain implementations, the anycast addresses excluded from one metro may not be the same as those excluded from any other metro's excluded addresses.

As previously noted, each DNS server added to the network 500 may be assigned a unique monitoring address. In systems supporting multiple protocols, a monitoring address may be provided for each of protocols (e.g., an IPv4 monitoring address and an IPv6 monitoring address). Such addresses may be specifically chosen to be outside the range of addresses eligible to be announced to the next hop router such that they are specifically reserved for monitoring purposes.

Figure 7:
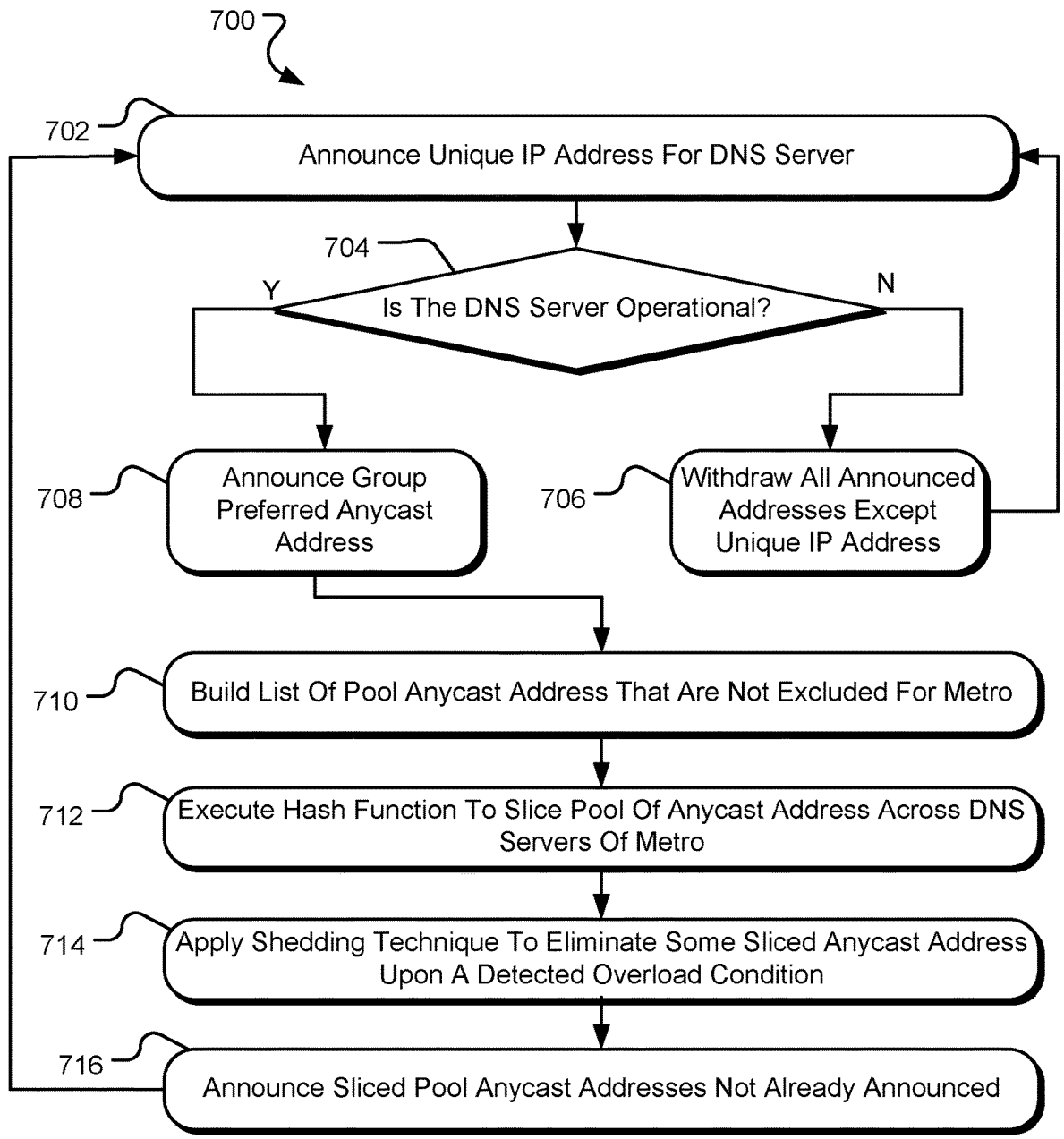
FIG. 7 is a flowchart of a method for utilizing a plurality of anycast addresses in a DNS architecture of a CDN.

FIG. 7 is a flowchart of a method 700 for utilizing a plurality of anycast addresses in a DNS architecture of a CDN. The method 700 may be performed by one or more DNS server of a DNS architecture 208 of a network, such as a CDN. The operations of the method 700 may be performed through execution of a software program, a hardware or combination of hardware components, or a combination of both hardware and software components of the DNS server. In other implementations, the method 700 may be performed by other components of a telecommunications network or a content delivery network. Further, one or more of the operations may be performed by other separate components of the network, including some performed by a DNS server and others performed by a central controller of the DNS architecture 208.

Beginning in operation 702, the server may announce a corresponding unique IP address for monitoring purposes, as described above. For example and utilizing the network configuration 500 of FIG. 6, server A 510 may announce unique IP address A such that other components of the network 102 and the metro 526 to which the server is connected may monitor for the announcement of unique IP address A to determine if server A is present in the network 500. In operation 704, the DNS server may determine if the sever is operational. For example, server A 510 may monitor the internal operation of the server to determine if one or more operational faults is occurring. If the server is not operational, the server may withdraw all previously announced anycast addresses (through a BGP session with connected device), except for the unique IP address in operation 706. This operation removes the server from receiving DNS requests until the operational status of the server can be re-established. The server may return to operation 702 to again announce the unique IP address for the server and continue to monitor the server for an operational status.

If the server is operational, the server may announce the group preferred anycast address associated with the router to which the server is connected in operation 708. For example and as described above, one or more routers of the network 500 may be associated with a preferred anycast address from the available anycast addresses utilized by the network. The preferred anycast address is routinely announced by the servers connected to the router such that each server may receive requests associated with at least one anycast address. As previously discussed, such preferred addresses generally correspond to anycast addresses that will be advertised by DNS servers within a particular group (such as a group of servers connected to a particular router or other networking device). In some implementations, each list of such addresses may be transmitted or otherwise pushed out to its respective DNS server by a centralized configuration computing device. In general, the centralized configuration computing device may provide global configuration information to DNS servers in the DNS architecture 208, including BGP configurations, monitoring IP addresses, group or groups of servers to which a particular server belongs, and/or the number of servers within the group.

In operation 710, the server may build a list of pool anycast addresses that are not excluded for the metro in which the server is located. For example, server A 510 of the network environment 500 of FIG. 5D may receive an indication of the metro 526 to which the server belongs and the pool of available anycast addresses for that metro. In the example, the NYC metro 536 excludes anycast addresses 15 and 16, but may advertise anycast addresses 1-14. Further, server A 510 may receive an indication of the other five servers 512-520 in the metro 526. The pool of anycast addresses of the metro 526, excluding anycast addresses 15 and 16, may be built by server A from this information associated with the metro. In operation 712, the server may execute a hashing function or technique to determine which of the available pool of anycast addresses for that metro 526 to announce. As described above, the pool of available anycast addresses may be sliced between the available servers of the metro. Using the NYC metro 526 as an example, six servers are available to respond to DNS requests such that the available pool of anycast addresses for that metro 526 may be sliced among the available servers

510-520. The hashing function or algorithm executed by each server 510-520 of the NYC metro 526 may determine which anycast addresses each server announces to slice the addresses across the available servers in the group or metro. For example and based on the hashing function, server A 510 may determine to announce anycast addresses 1, 7, and 13. Other servers within the metro 526 announce other anycast addresses, including some that may overlap with other servers in the group (such as one or more preferred anycast addresses of a router). The hashing function may be repeatable for all servers such that no centralized control over the determination of which anycast addresses are selected by which servers is needed. However, in some implementations, such a list may be provided to the DNS server from a centralized configuration system. Such a hashing function may generally include evenly or otherwise distributing the pool of non-excluded anycast addresses across a known number of available DNS servers within a group to identify which of the anycast addresses are to be advertised by the DNS server executing the hashing algorithm.

In operation 714, the server may apply a shedding technique to the determined sliced anycast addresses for that server upon a detection of an overload condition. As mentioned above, an overload condition may occur when traffic to a server meets or exceeds a threshold value, a forecast of future received traffic based on current trends of received traffic meets or exceeds a threshold, detected attacks on one or more components of the network, information or data received from the network 102 or an administrator of the network, and the like. The shedding technique may identify one or more anycast address from the sliced anycast addresses for the server to shed or cease announcing. For example, server A 510 may execute the shedding algorithm to determine anycast address 13 as an address to shed when overloaded. Additional anycast addresses may be determined to be shed, based on a type of overload condition and/or a duration of the detected overload condition. In operation 716 and after the server determines which anycast addresses from the pool of addresses for the metro are sliced to that server and which anycast addresses are shed due to an overload condition, the server may announce the determined anycast addresses for that server. The execution of each of the hashing algorithm and the shed algorithm results in a list of anycast addresses that are not to be advertised by the DNS server. Accordingly, the DNS server may withdraw such anycast addresses from those advertised by the DNS server and then announce/advertise any anycast addresses that are not otherwise excluded or withdrawn.

The server may return to operation 702 to begin the announcement loop again and, as a result, may be periodically executed by the DNS server to dynamically update the anycast addresses that it advertises. For example, in certain implementations the method 700 may be executed every minute (or some other periodic time period) such that the DNS server maintains a current list of advertised anycast addresses based on loading conditions within the network. Further, each DNS server in the DNS architecture 208 may know whether other DNS servers within its group or metro are functional. This information may then be used during execution of the hashing algorithm to determine which of the non-excluded anycast addresses are to be assigned to each DNS server. In certain implementations, each DNS server within a group or metro may determine the status of each other DNS server within the group using the monitoring addresses assigned to each DNS server. Because each address is preferred somewhere within the network, at least one DNS server will be advertising each anycast address. As a result, synchronization of status information for each DNS server is not necessarily required in some implementations, although such information may be used when executing the consistent hash algorithm (or similar algorithm) for slicing anycast addresses between devices.

In some implementations, the shedding algorithm of the method 700 may be tuned to remove anycast addresses advertised by a DNS server relatively quickly but to add them back to the DNS server relatively slowly. For example, shedding may be triggered if the load experienced by the DNS server is high for a minute or longer but five or more minutes of low traffic may be required before the DNS server begins re-advertising any shed addresses. In some implementations, the shed algorithm may attempt to estimate capacity. For example, central processing unit (CPU) utilization of the DNS server may be retrieved or determined and used as the primary factor in deciding whether to shed traffic. So, if CPU utilization is at 90% and a threshold of 80% utilization is applied, $\frac{1}{9}$ (i.e. 11.1%) of the anycast addresses for the DNS server may be shed. Conversely, the quantity of shed anycast addresses may be reduced if loading of the DNS server falls after an initial shedding operation. For example and using the same 80% utilization threshold, if the load falls to only 20% and 90% of anycast addresses are have been shed by the DNS server (i.e., 10% of all IP addresses result in 20% loading), the percentage of shed addresses may be reduced to 60% of all anycast addresses.

Further, some implementations may utilize a daemon to announce BGP routes between the DNS servers and routers. Such a daemon may be a relatively simple announcement-only type of daemon that may include alarming capabilities. Some implementations may also delegate domains within the DNS architecture 208. For example, the .NET domain and the .ORG domain may be split between the domains to ensure that an issue with any domain will minimize disruption. Such an approach may also minimize the packet sizes sent from any global top-level domain (GILD) servers. Authority records for some delegations may then be served from respective sets of static DNS servers. For example, using the delegation provided above, .NET authority records may be served from one set of static DNS servers while .ORG authority records may be served from another.

In addition to the above, certain implementations may support customer domains being delegated to broader network operators. For example, in one implementation, 64 anycast addresses with names such as dns-01, dns-02, dns-03, . . . dns-64 may be provided with each name being assigned a unique IP out of the pool addresses. These names may be associated with wildcard records. So, for example, foo.dns-01 may return a result for dns-01. Each customer that delegates to the network operator may get a list of DNS servers (e.g., a list of 8 DNS servers) to use from this list, and a unique customer-specific prefix to use such that delegations may be changed at a later date. For vanity DNS servers (i.e., where the customer desires the DNS server to be within the customer's domain name) a set of IP addresses (e.g., 8 IP addresses) may be randomly selected per protocol from the list of pool addresses and used for [a-h] .ns.<customer domain>.

For off-net DNS servers, additional control over BGP communities and paths may be included and addresses may be announced in a different manner. For example, a different abstraction may be implemented for the pool IPs in which the pool IPs are grouped into groups of a predetermined size (e.g., groups of eight assuming 64 addresses total). For purposes of this disclosure, each of these groups is referred to as an "off-net prefix".

In some instances, addresses and off-net prefixes may conform to certain requirements. One requirement may be that each off-net prefix is to be assigned out of a single subnet. For example, each off-net prefix containing 8 individual addresses may need to be assigned out of a single /24 or /48 subnet. In such an implementation, each off-net DNS network will thus need 8 /24s or /48s. Another requirement may be that no other addresses are to be used within a subnet with the exception of self-IPs being able to be assigned from the subnets for on-net clusters. Each subnet may also need to be part of an announced aggregate on a given autonomous system. In other words, a given subnet may not be the only announcement covering a network. Each subnet may also need to be announced by a corresponding autonomous system in all regions (including all peers). Another requirement may be that the shorter prefix (larger) aggregates that include the subnets also must be announced by the autonomous system to all regions. This ensures reachability for a default free zone customer of the DEC ISP who might filter certain subnet announcements based on operator choices to limit propagation of such announcements. Such customers may continue to see these aggregates, even if they don't see the particular subnets.

In addition to the requirements provided above, additional host flags may be used to implement off-net nameservers. For example, such host flags may include: an "off-net" host flag for indicating that addresses need to be handled in groups of predetermined sizes; a BGP communities host flag indicating which communities (which may include standard and/or extended communities) should be sent; a BGP prepend host flag indicating how many times an ASN should be pre-pended to an announcement; and a BGP max prefixes host flag that stores a limit on the number of prefixes that a given DNS server may support.

In certain implementations, no "preferred" anycast address may be assigned to off-net servers. The off-net server may also operate on groups of a predetermined number of anycast addresses when deciding to shed or not to shed. For example, the off-net server may be configured to shed 8 (or any other predetermined number) of addresses at once for each "step" when addressing overloading or similar situations. Any "excluded" anycast addresses for a given metro may cause the entire subnet to be excluded from announcements. Also, off-net server may, in certain implementations, be assigned a unique IP address within a dedicated subnet which may be used to validate that BGP propagation is done properly.

Figure 8:
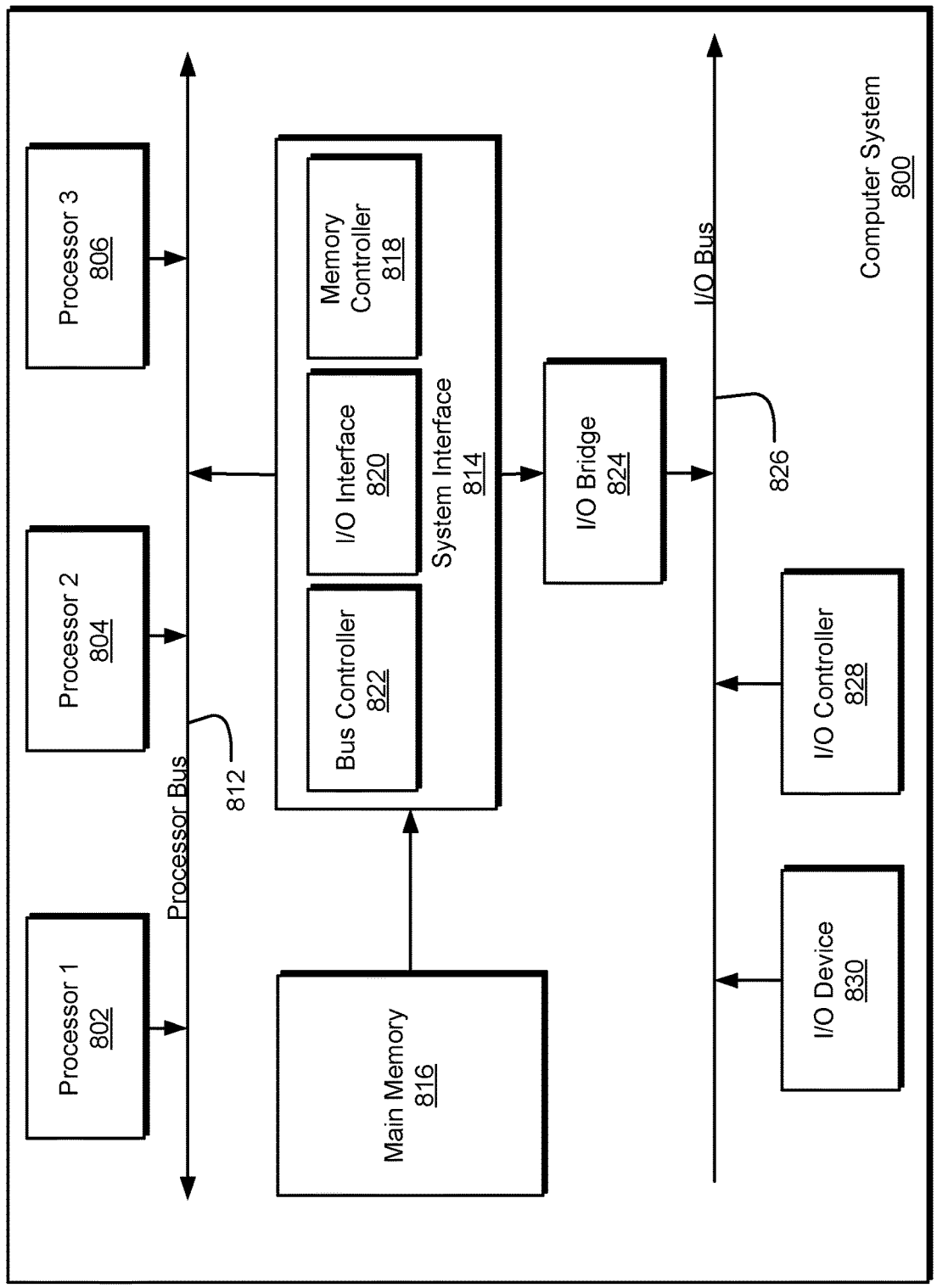
FIG. 8 is a diagram illustrating an example of a computing system which may be used in implementing embodiments of the present disclosure.

FIG. 8 is a block diagram illustrating an example of a computing device or computer system 800 which may be used in implementing the embodiments of the components of the network disclosed above. For example, the computing system 800 of FIG. 8 may be one or more of the DNS servers discussed above. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. System interface 814 may be connected to the processor bus 812 to interface other components of the system 800 with the processor bus 812. For example, system interface 814 may include a memory controller 814 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 830, as illustrated.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 816, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Figure 9:
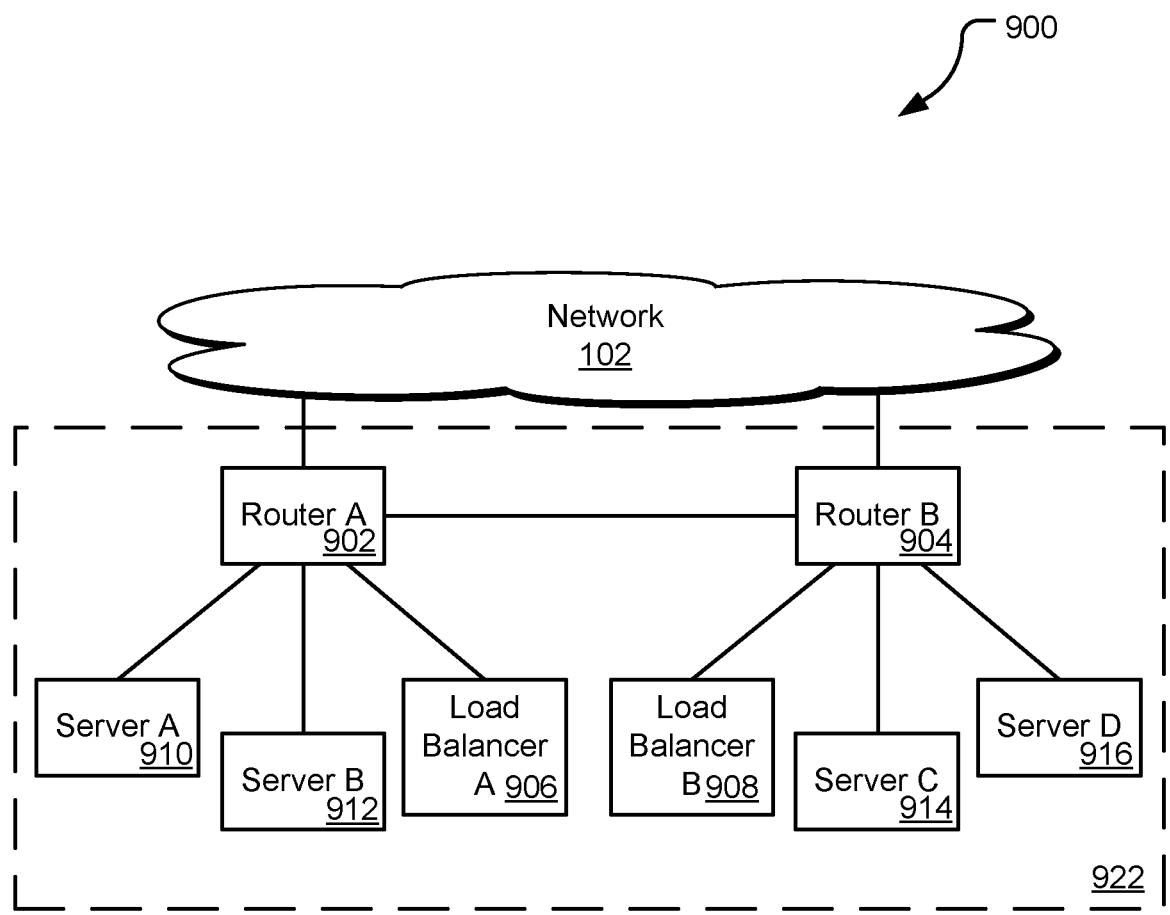
FIG. 9 is an example network environment for utilizing one or more load balancer devices in a DNS architecture.

FIG. 9 is an alternate network design for utilizing one or more load balancer devices in a DNS architecture. In particular, the network environment 900 includes a metro 922 with one or more routers (e.g., router A 902 and router B 904) connected to a network 102. One or more DNS servers 910-912 may be connected to router A 906 and one or more DNS servers 914-916 may be connected to router B 908 for responding to DNS requests received through network 102. In this implementation, however, a load balancer device A 906 is in communication with router A 906 and a load balancer B 908 is in communication with router B 908 for performing the load balancing features of the routers described in the embodiments above. Load balancers 906-908 may be user datagram protocol (UDP)-based load balancer devices and may be implemented to support direct server return. In this network configuration 900, packet flow into the DNS servers 910-916 coupled to the routers 902-904 is directed through one of the two load balancers 906-908, while outflow (e.g., flow back to an ISP resolver or other requesting device) may travel directly and bypass the load balancers.

The load balancers 906-908 may be implemented in several ways. For example, in one implementation, the load balancers 906-908 may be dedicated hardware devices designed for load balancing of TCP and UDP connections. In other implementations, the load balancers 906-908 may instead be general-purpose devices. For instance, the load balancers may be an edge router with layer 4/7 capability, general-purpose hardware running load balancing software, or may utilize a kernel network translation with multiple destinations to facilitate load balancing. While these design options differ in the capability of monitoring the service, all may perform a similar function that was provided by the router in the load-balancer-less solution previously discussed.

In some implementations, the load balancers 906-908 may support direct server return (DSR) functionality such that, when a packet is received at the load balancer, the destination address for the packet may be transformed to be a unicast DNS address associated with a single DNS server 910-916, and then resent with the source address unchanged. The receiving DNS server would therefore receive the packet with the source IP address still present in the source of the packet, allowing it to be used for rendezvous decisions. In such circumstances, the actual DNS answer may be terminated on the load balancer device and, when the load balancer receives a DNS query, a DNS request is sent to the backend DNS servers. As a result, the request provided to the DNS servers would originate from the load balancer 906-908.

To support DSR, the DNS servers 910-916 may have one VIP address associated with each public DNS server IP address. Thus, a request that is received by the load balancer 906-908 on a public DNS IP address A may be transformed and sent to VIP address A on DNS server X (the "VIP" in this case will merely be a unique destination port). A request received by the load balancer 906-908 for public DNS IP address B would go to a different VIP (port in this case) on DNS server X. Thus, if there are four public DNS addresses, there would be four DNS VIPs (ports) configured on each backend DNS server 910-916. In addition, the DNS operations may understand that when a request comes in on VIP A, it may be answered with a source IP address of public DNS IP address A. For example, assume that the load balancer A 906 selects DNS server A 910 from all available servers as the server to answer the DNS request. Packet flow within such a system may occur in accordance with the below table:

| | Sent from ISP | Translated into new packet on load balancer | Reply packet from DNS server to ISP |
|---|---|---|---|
| Source | <ISP addr>: <ISP port 1> | <ISP addr>: <ISP port 1> | <LB addr>: <LB port 2> |
| Destination | <LB addr>: <LB port 1> | <DNS addr>: <DNS port 1> | <ISP addr>: <ISP port 2> |

In this network configuration 900, the load balancer A 906 translates the packet to an intermediate format. The DNS server 910 generally is informed of the actual address to use to answer the DNS request.

Monitoring of servers 910-916 in the network configuration 900 that includes \load balancers 906-908 may include health checks be sent via the load balancer 906-908 to a specific nameserver such that that the complete network path to/from the nameserver can be monitored. For example, should restrictive reverse path forwarding (RPF) be enabled on the router 902, some packets may be dropped even if the unicast address of the server was still reachable. Such monitoring may be performed in substantially the same way proposed for the non-load-balancer solution above, with an anycast VIP (announced by the load balancer 906) assigned to a specific nameserver host for monitoring purposes. Further, in some implementations of network environment 900, a predetermined number of distinct public IP addresses for each of IPv4 and IPv6 may be used for delegation by global top level domain servers. For example, eight such addresses may generally allow for a balance between complexity and sufficient granularity to engage in traffic engineering if required during periods of high load.

One advantage of implementing a load balancer 906 in the network configuration 900 is that it may allow computing devices within a datacenter to function as part of a larger DNS cluster. In particular, all backend machines for a given anycast VIP on the load balancer 906 may also be within a single datacenter to facilitate interaction with ISP resolver statistical tracking (used by ISP resolvers to select which authoritative resolvers will answer a request). However, a second VIP on the load balancer may point at other resolvers. These other resolvers may each be within a single datacenter, which may be a different datacenter than that associated with the first VIP so long as all the backends for a given VIP are within a single datacenter. The public IPs may be split into a predetermined number of "pools". For example, in one implementation, the public IPs may be split into four pools. Within any single metro, only a subset of the pools may be advertised. So, for example, if four pools exist, up to three pools may be advertised. By doing so, the issue where a datacenter blackholes all traffic causes unrelated outages. Also, each pool will have two IP addresses associated with it under normal circumstances.

In certain implementations, each pool may be associated with at least one back end server and no backend server may be associated with more than one pool in order to minimize impact should a server blackhole traffic. These pool backend servers may be configured as tier-1 servers in the load balancer. Handling of overloaded backend servers described below in further detail. Should all backend servers associated with a pool become unavailable, tier-2 and, if necessary, tier-3 servers may be utilized. Tier-2 servers may correspond with backend servers associated with the same pool address located in another datacenter (e.g., a major datacenter nearby) while tier-3 servers may consist of all servers within a pool globally. In one example, each load balancer 906-908 of a metro 922 may be allocated to the pools as either the "ODD" or "EVEN" load balancer. The ODD/EVEN distinction refers to which of the two addresses associated with a pool is announced by the load balancer as primary addresses. Two example ways this can be accomplished are: (1) modifying BGP export policies on a route reflector; and (2) implementing heartbeat monitoring. For modifying BGP export policies, the route reflector may accept multi-exit discriminators (MEDs) from the edge routers associated with itself, but may reset those MEDs when exporting routes. Each load balancer would may announce all addresses (ODD and EVEN, in the example) for its' associated pools. However, the non-preferred addresses (e.g., EVEN addresses on an ODD balancer) may be announced with a higher MED. For instance, preferred addresses may be announced with a MED of 0 while non-preferred addresses may be announced with a MED of 500. When exporting the routes off of the route reflector, the MEDs for these routes may be reset to 0. Doing so may keep failover local within the metro for a failed load balancer, and provide fairly seamless failover without significant service interruption. Implementing heartbeat monitoring may include an outside process to reconfigure the BGP announcements on the load balancer when a corresponding load balance "mate" goes offline. To accomplish this, each load balancer may advertise its preferred addresses along with an IP address uniquely associated with that load balancer. Should the unique IP become unreachable from the other load balancer, the other load balancer may begin to advertise the non-preferred addresses in addition to the preferred addresses.

Denial of service attacks are a persistent threat against the DNS environment and can lead to load-related outages. Accordingly, it is often desirable to have the ability to utilize all servers, world-wide, in the event of a major attack in order to "sink" traffic related to the attack. To address overloading (whether caused by an attack or other event), each backend DNS server may report load and each load balancer may independently gather the reported load information. The load information may indicate the "shed factor" of the backend server, and may be calculated the same way as is used in the previously discussed implementation of this disclosure. The shed value may be used to weight servers within a tier on each load balancer. For example, a server reporting needing to shed 20% of traffic may be assigned a weight of 0.8. As long as the weight of at least one server in a tier remains 1, the server functions within the tier. Should a tier need to shed to the next tier, the servers of the next tier may be temporarily added to the current tier level, with weights appropriate to pull the amount of traffic necessary to reduce the load on the other machines within that tier. The redistribution algorithm may also consider whether a server has excess capacity, and may not simply send traffic to a server that may not have excess capacity. In this manner, traffic could be distributed among all servers throughout the world as necessary. In certain implementations, once shedding to Tier 3 begins no attempt may be made to provide low latency responses preferentially, although Tier 2/Tier 3 may only receive the requests Tier 1 could not handle on its' own.

In certain implementations, the foregoing functionality may include providing certain additional information to each of the DNS servers. Such information may include, without limitation, new host flags for the DNS servers, new host types and flags for the load balancers, and new global configuration information that may be maintained, for example, in a configuration table. New host flags for the DNS servers may include a pool name. New host types and flags for the load balancers may include associations between DNS networks, a role (e.g., the EVEN or ODD assignment discussed in the foregoing example), a monitoring address (also referred to herein as a "sentinel address" or "sentinel IP"), a peer IP, a self ASN, and a peer ASN. New global configuration data may include a list of pools and associated public IP addresses as well as ports associated with such pools. Such information may be maintained in certain implementations by a central computing system and distributed or "pushed out" to devices within the network (e.g., DNS servers and load balancers). Also, to the extent any of the information includes address information, such address information may be maintained for multiple protocols (e.g., IPv4 and IPv6).

Any suitable number of pools may be implemented in the DNS architecture 208, with each including a suitable number of anycast addresses. For example, in one implementation, the system may include four pools (labeled A, B, C, D, for example) with each pool consisting of two anycast addresses. Addresses may be chosen such that they are advertised by two or more separate subnets to peers/customers. Each DNS network may have its' own idea of pools, but the names for such pools may be reused. In certain implementations, the system may throw an alarm on if all possible pools exist in any metro 922, i.e., if host table entries exist such that all pools are present for a given DNS network. Also, in certain implementations, each group (or first DNS machine on a router) may be assigned a unique "preferred pool" address, which may be assigned for each of IPv4 and IPv6. This can be any pool address not used by another group as a pool IP. It should be appreciated that there is no limit on the number of machines within a pool within a metro 922 (or globally).

Figure 10:
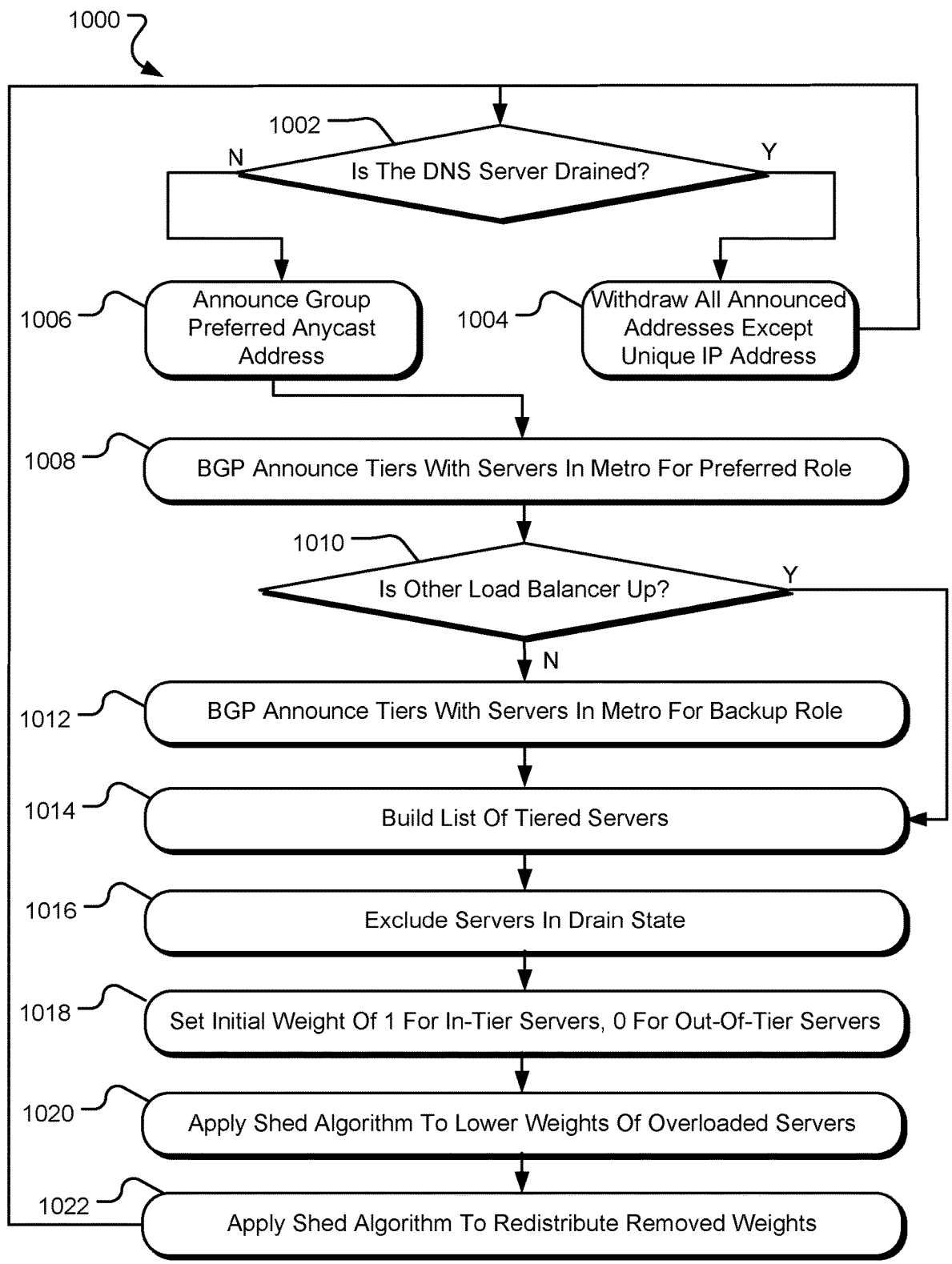
FIG. 10 is a flowchart of a method for a load balancer to actively monitor each of the other load balancers in a metro or group.

In certain implementations, availability of backends may be monitored by the load balancer software directly. Also, each load balancer may implement an algorithm to adjust weights and determine what to announce. For example, FIG. 10 illustrates a method 1000 for a load balancer to actively monitor each of the other load balancers in a metro 922 or group. The method 1000 provides a mechanism to utilize all DNS servers under extreme load scenarios and enables the previously discussed functionality of the load balancers with limited sharing of state between machines. In general, the operations of the method 1000 may be performed by a load balancer, such as load balancer A 906 of network 900.

Beginning in operation 1002, the load balancer 906 may determine if a target DNS server is drained. If the server is drained, the load balancer 906 may withdraw all announced addresses except the unique IP address in operation 1004, similar as described above. If the DNS server is not drained, the load balancer 906 may announce the group preferred anycast address in operation 1006, also similar to as described above. In operation 1008, the load balancer may BGP announce those tiers within the servers in the metro 922 with a preferred role. In operation 1010, the load balancer 906 may determine if another load balancer in the metro 922 is up and operational. If not, the load balancer 906 may BGP announce tiers with servers in the metro 922 with a backup role.

If the other load balancer is operational or the load balancer 906 announces the tiers for the backup role, the load balancer 906 may build a list of tiered servers in operation 1014 while excluding those servers in a drain state in operation 1016. In operation 1018, the load balancer 906 may set an initial weight of 1 for all in-tier servers and an initial weight of 0 for all out-of-tier servers. In operation 1020, the load balancer 906 may apply a shed algorithm to lower weights for overloaded servers and, in operation 1022, to redistribute removed weights. The load balancer 906 may then return to operation 1002 to repeat the loop.

The shed algorithm may, in some instances, be tuned to shed relatively quickly but un-shed relatively slowly. For example, if load is high for a minute, start shedding but require load to be low for five minutes to gain traffic back. In certain implementations, the shed algorithm may attempt to estimate capacity. For example, CPU utilization of the DNS server may be the primary factor in deciding whether to shed traffic. So, if CPU utilization is at 90% and a threshold of 80% utilization is applied, $1/9$ (i.e. 11.1%) of the IP addresses for the DNS server may be shed. Conversely, the quantity of shed IP addresses may be reduced if loading of the DNS server falls after an initial shedding operation. For example and using the same 80% utilization threshold, if the load falls to only 20% and 90% of IP addresses are have been shed by the DNS server (i.e., 10% of all IP addresses result in 20% loading), the percentage of shed addresses may be reduced to 60% of all IP addresses. In certain implementations, the method 1000 may be executed at regular periodic intervals (e.g., every minute).

To translate an address of a received packet, the load balancer may determine a destination server's unicast address, determine a destination server port, preserve the source address of the packet in a datagram, and retransmit UDP datagram with the translated destination. In this implementation, a packet is resent by the load balancer but to a different destination and the source (e.g., the ISP resolver) will remain unchanged. Address translation on the receiving DNS server may include determining if the packet is sent to a pool UDP port number. If no, the server may respond to the packet without a translation. If yes, however, the server may set an answer packet source IP address to the pool public IP address and source port and transmit the answer packet with that translation.

In some implementations with the load balancer, each DNS server may monitor reachability and functionality of all public IPs, and may alarm if unreachable IPs are identified. The monitoring/sentinel IP of the load balancer may also be configured with multiple ports listening, each pointing at a different individual server as the backend server. These may also be tested to allow full path validation that can be localized to the appropriate path. It should be noted that the responses in such cases will come from the pool address associated with the backend DNS server and not the monitoring/sentinel IP address.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for processing domain name system (DNS) requests, the method comprising:
    announcing, by a DNS server of a plurality of DNS servers and based on a configuration of the plurality of DNS servers, a subset of a plurality of anycast Internet Protocol (IP) addresses associated with a DNS network, the DNS server configured to receive a DNS request comprising at least one of the subset of the plurality of anycast IP addresses;
    receiving, at the DNS server and from a networking device, the DNS request comprising the at least one of the subset of the plurality of anycast IP addresses; and
    generating a response to the DNS request.

2. The method of claim 1, further comprising:
    determining a number of the plurality of DNS servers of the DNS network;
    executing a hash function to slice the plurality of anycast IP addresses based on the number of the plurality of DNS servers of the DNS network, wherein a result of the hash function identifies the subset of the plurality of anycast IP addresses announced by the DNS server.

3. The method of claim 2, further comprising:
    load balancing a plurality of DNS requests to the DNS server based on the subset of the plurality of anycast IP addresses announced by the DNS server.

4. The method of claim 1, further comprising:
    receiving, from a DNS controller, an identification of the subset of the plurality of anycast IP addresses.

5. The method of claim 1, further comprising:
    announcing, by the DNS server to the networking device and in addition to announcing the subset of the plurality of anycast IP addresses, a unique identification address associated with the DNS server.

6. The method of claim 5, further comprising:
    monitoring for announcement of a plurality of unique identifications from a subset of the plurality of DNS servers; and
    generating an error message in response to receiving less than all of the plurality of unique identifications from a subset of the plurality of DNS servers.

7. The method of claim 1, further comprising:
    removing, based on an overload condition at the DNS server, one or more anycast IP addresses from the announced subset of the plurality of anycast IP addresses to redirect additional DNS requests associated with the removed one or more anycast IP addresses to another DNS server of the DNS network.

8. The method of claim 7, further comprising:
    receiving a preferred anycast IP address of the plurality of anycast IP addresses, the preferred anycast IP address unique to the networking device in communication with the DNS server; and
    announcing the preferred anycast IP address during an overload condition at the DNS server.

9. The method of claim 1, wherein the DNS network comprises a first metro network and a second metro network, the method further comprising:
redirecting, based on an overload condition at a first DNS server of the first metro network, a plurality of DNS requests to a second DNS server of the second metro by ceasing announcement of at least one anycast IP address at the first DNS server.

10. A domain name system (DNS) architecture comprising:
a networking device; and
a plurality of DNS servers each in communication with the networking device, at least one of the plurality of DNS servers configured to:
announce, based on a number of the plurality of DNS servers to the networking device, a subset of a plurality of anycast Internet Protocol (IP) addresses associated with the DNS architecture to which one or more DNS requests for the DNS architecture are addressed;
receive, from the networking device and based on at least one of the announced subset of the plurality of anycast IP addresses, a DNS request comprising the at least one of the announced subset of the plurality of anycast IP addresses; and
generate a response to the DNS request.

11. The domain name system of claim 10, further comprising:
at least one load balancer in communication with the networking device, the at least one load balancer configured to load balance a plurality of DNS requests to the plurality of DNS servers.

12. The domain name system of claim 10, wherein the at least one of the plurality of DNS servers is further configured to executing a hash function to slice the plurality of anycast IP addresses based on the number of the plurality of DNS servers of the DNS network, wherein a result of the hash function identifies the subset of the plurality of anycast IP addresses announced by the DNS server.

13. The domain name system of claim 10, further comprising:
a controller configured to transmit an identification of the subset of the plurality of anycast IP addresses to the at least one of the plurality of DNS servers.

14. The domain name system of claim 10, wherein the at least one of the plurality of DNS servers is further configured to:
receive a unique identification address associated with a second DNS server of the plurality of DNS servers; and
determine, based on the unique identification address associated with the second DNS server, an operating state of the second DNS server.

15. The domain name system of claim 10, wherein the at least one of the plurality of DNS servers is further configured to:
remove, based on an overload condition at the at least one of the plurality of DNS servers, one or more anycast IP addresses from the announced subset of the plurality of anycast IP addresses to redirect additional DNS requests associated with the removed one or more anycast IP addresses to redirect additional DNS requests associated with the removed one or more anycast IP addresses to another DNS server of the plurality of DNS servers.

16. The domain name system of claim 15, wherein the networking device is associated with a preferred anycast IP address from the plurality of anycast IP addresses, each of the plurality of DNS servers connected to the networking device announcing the preferred anycast IP address during an overload condition at the DNS server.

17. A communications network comprising:
a first metro network comprising:
a first networking device; and
a first plurality of DNS servers each in communication with the first networking device; and
a second metro network geographically separate from the first metro network and in communication with the first metro network, the second metro network comprising:
a second networking device; and
a second plurality of DNS servers each in communication with the second networking device, wherein at least one of the first plurality of DNS servers and at least one of the second plurality of DNS servers are configured to:
announce a subset of a plurality of anycast Internet Protocol (IP) addresses to which one or more DNS requests are addressed;
receive, from a corresponding networking device and based on at least one of the announced subset of the plurality of anycast IP addresses, a DNS request comprising the at least one of the announced subset of the plurality of anycast IP addresses; and
generate a response to the DNS request.

18. The communications network of claim 17 wherein the at least one of the first plurality of DNS servers is further configured to:
detect an overload condition at the at least one of the first plurality of DNS servers; and
redirect, to the at least one of the second plurality of DNS servers, DNS requests associated with at least one of the announced subset of the plurality of anycast IP addresses.

19. The communications network of claim 18, wherein detecting the overload condition at the at least one of the first plurality of DNS servers comprises comparing a rate of received DNS requests at the at least one of the first plurality of DNS servers to an overload threshold value.

20. The communications network of claim 18 wherein the first metro network further comprises:
at least one load balancer in communication with the first networking device, the at least one load balancer configured to load balance a plurality of DNS requests to the first plurality of DNS servers.

* * * * *